(12) United States Patent  
Rahman et al.

(10) Patent No.: US 12,389,440 B2
(45) Date of Patent: Aug. 12, 2025

(54) METHOD AND APPARATUS FOR CONFIGURING A REFERENCE SIGNAL BURST

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 445 days.

(21) Appl. No.: 17/689,838

(22) Filed: Mar. 8, 2022

(65) Prior Publication Data

US 2022/0295499 A1    Sep. 15, 2022

Related U.S. Application Data

(60) Provisional application No. 63/160,430, filed on Mar. 12, 2021, provisional application No. 63/315,758, filed on Mar. 2, 2022.

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0051* (2013.01); *H04W 72/0446* (2013.01);
(Continued)

(58) Field of Classification Search
CPC ............. H04W 76/20; H04W 72/0446; H04W 72/542; H04W 80/02; H04W 72/23;
(Continued)

(56) References Cited

U.S. PATENT DOCUMENTS

2018/0279145 A1    9/2018  Jung et al.
2019/0053072 A1*   2/2019  Kundargi .............. H04W 16/28
(Continued)

FOREIGN PATENT DOCUMENTS

CN    112188623 A    1/2021
EP    3713130 A1     9/2020
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Andrew Lee

(57) ABSTRACT

A method for operating a user equipment (UE) comprises receiving a configuration via a radio resource control (RRC) message, the configuration including information about a channel state information reference signal (CSI-RS) burst comprising B>1 time instances of CSI-RS transmission; measuring the CSI-RS burst; determining, based on the measurement, time-domain (TD) or Doppler domain (DD) components of a downlink (DL) channel; and transmitting a CSI report including an indication about the TD or DD components of the DL channel.

18 Claims, 22 Drawing Sheets

(51) Int. Cl.
*H04W 72/0446* (2023.01)
*H04W 72/23* (2023.01)
*H04W 76/20* (2018.01)
*H04W 80/02* (2009.01)

(52) U.S. Cl.
CPC ........... *H04W 72/23* (2023.01); *H04W 76/20* (2018.02); *H04W 80/02* (2013.01)

(58) Field of Classification Search
CPC .... H04B 7/0456; H04B 7/063; H04B 7/0626; H04L 5/0051; H04L 5/0094
See application file for complete search history.

(56) References Cited

U.S. PATENT DOCUMENTS

| | | | |
|---|---|---|---|
| 2019/0082426 A1* | 3/2019 | Liou | H04W 72/0446 |
| 2020/0153541 A1* | 5/2020 | Faxér | H04L 5/0057 |
| 2022/0094412 A1* | 3/2022 | Ren | H04L 25/0224 |
| 2022/0231738 A1* | 7/2022 | Haustein | H04B 7/0408 |
| 2023/0189270 A1* | 6/2023 | Matsumura | H04B 7/06952 370/329 |
| 2023/0198842 A1* | 6/2023 | Da Silva | H04L 5/0007 370/254 |
| 2023/0239114 A1* | 7/2023 | Kim | H04L 5/0094 370/329 |
| 2023/0239126 A1* | 7/2023 | Liu | H04L 5/0048 370/329 |
| 2023/0308238 A1* | 9/2023 | Yuan | H04L 5/0051 |
| 2023/0396385 A1* | 12/2023 | Kwak | H04W 72/232 |

FOREIGN PATENT DOCUMENTS

| | | |
|---|---|---|
| KR | 10-2018-0108397 A | 10/2018 |
| WO | 2020182269 A1 | 9/2020 |
| WO | 2021029701 A1 | 2/2021 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"LTE; Evolved Universal Terrestrial Radio Access (E-UTRA); Medium Access Control (MAC) protocol specification 3GPP TS 36.321 version 16.6.0 Release 16)", ETSI TS 136 321 V16.6.0, Oct. 2021, 144 pages.

"LTE; Evolved Universal Terrestrial Radio Access (E-UTRA); Radio Resource Control (RRC); Protocol specification (3GPP TS 36.331 version 16.7.0 Release 16)", ETSI TS 136 331 V16.7.0, Jan. 2022, 1099 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"Measurement results on Doppler spectrum for various UE mobility environments and related CSI enhancements", 3GPP TSG RAN WG#86, RP-192978, Dec. 12, 2019, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

International Search Report and Written Opinion issued Jun. 14, 2022 regarding International Application No. PCT/KR2022/003502, 8 pages.

"3rd Generation Partnership Project; Technical Specification Group Radio Access Network; NR; Physical layer procedures for data (Release 16)", 3GPP TS 38.214 V16.4.0, Dec. 2020, 169 pages.

Extended European Search Report issued Jul. 18, 2024 regarding Application No. 22767573.3, 13 pages.

Nokia et al., "Remaining Details of TRS Design", 3GPP TSG-RAN WG1 Meeting #91, R1-1720898, Nov. 2017, 12 pages.

Zte et al., "Summary of remaining issues on CSI measurement", 3GPP TSG RAN WG1 Meeting AH1801, R1-1801183, Jan. 2018, 24 pages.

* cited by examiner

METHOD AND APPARATUS FOR CONFIGURING A REFERENCE SIGNAL BURST

CROSS-REFERENCE TO RELATED APPLICATIONS AND CLAIM OF PRIORITY

The present application claims priority to U.S. Provisional Patent Application No. 63/160,430, filed on Mar. 12, 2021, and U.S. Provisional Patent Application No. 63/315,758, filed on Mar. 2, 2022. The content of the above-identified patent documents is incorporated herein by reference.

TECHNICAL FIELD

The present disclosure relates generally to wireless communication systems and more specifically to configuring a reference signal burst.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable configuring a reference signal burst.

In one embodiment, a UE in a wireless communication system is provided. The UE includes a transceiver configured to: receive a configuration via a radio resource control (RRC) message, the configuration including information about a channel state information reference signal (CSI-RS) burst comprising B>1 time instances of CSI-RS transmission. The UE further includes a processor operably coupled to the transceiver. The processor is configured to: measure the CSI-RS burst; and determine, based on the measurement, time-domain (TD) or Doppler domain (DD) components of a downlink (DL) channel. The transceiver is further configured to transmit the CSI report including an indication about the TD or DD components of the DL channel.

In another embodiment, a BS in a wireless communication system is provided. The BS includes a processor configured to: generate a configuration, the configuration including information about a CSI-RS burst comprising B>1 time instances of CSI-RS transmission. The BS further includes a transceiver operably coupled to the processor. The transceiver is configured to: transmit the configuration via an RRC message; transmit the CSI-RS burst; and receive a CSI report; wherein the CSI report includes an indication about TD or DD components of a DL channel, and wherein the TD or DD components of the DL channel are based on the CSI-RS burst.

In yet another embodiment, a method for operating a UE is provided. The method comprises: receiving a configuration via an RRC message, the configuration including information about a CSI-RS burst comprising B>1 time instances of CSI-RS transmission; measuring the CSI-RS burst; determining, based on the measurement, TD or DD components of a DL channel; and transmitting a CSI report including an indication about the TD or DD components of the DL channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
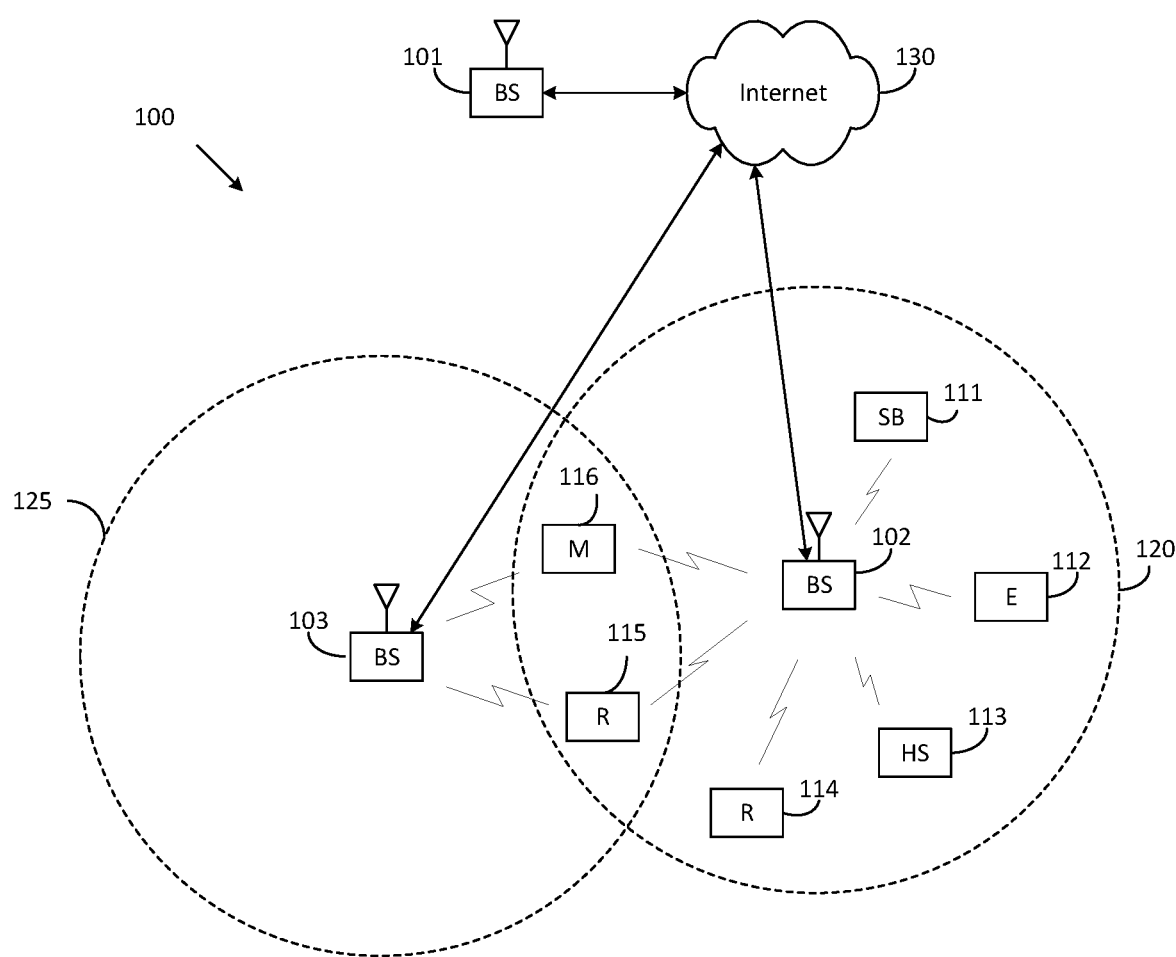
FIG. 1 illustrates an example wireless network according to embodiments of the present disclosure.

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 136.321 v16.6.0, "E-UTRA, Medium Access Control (MAC) protocol specification" (herein "REF 4"); 3GPP TS 136.331 v16.7.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0, "E-UTRA, NR, Physical layer procedures for data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); and 3GPP TS 38.211 v17.0.0, "E-UTRA, NR, Physical channels and modulation (herein "REF 10").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
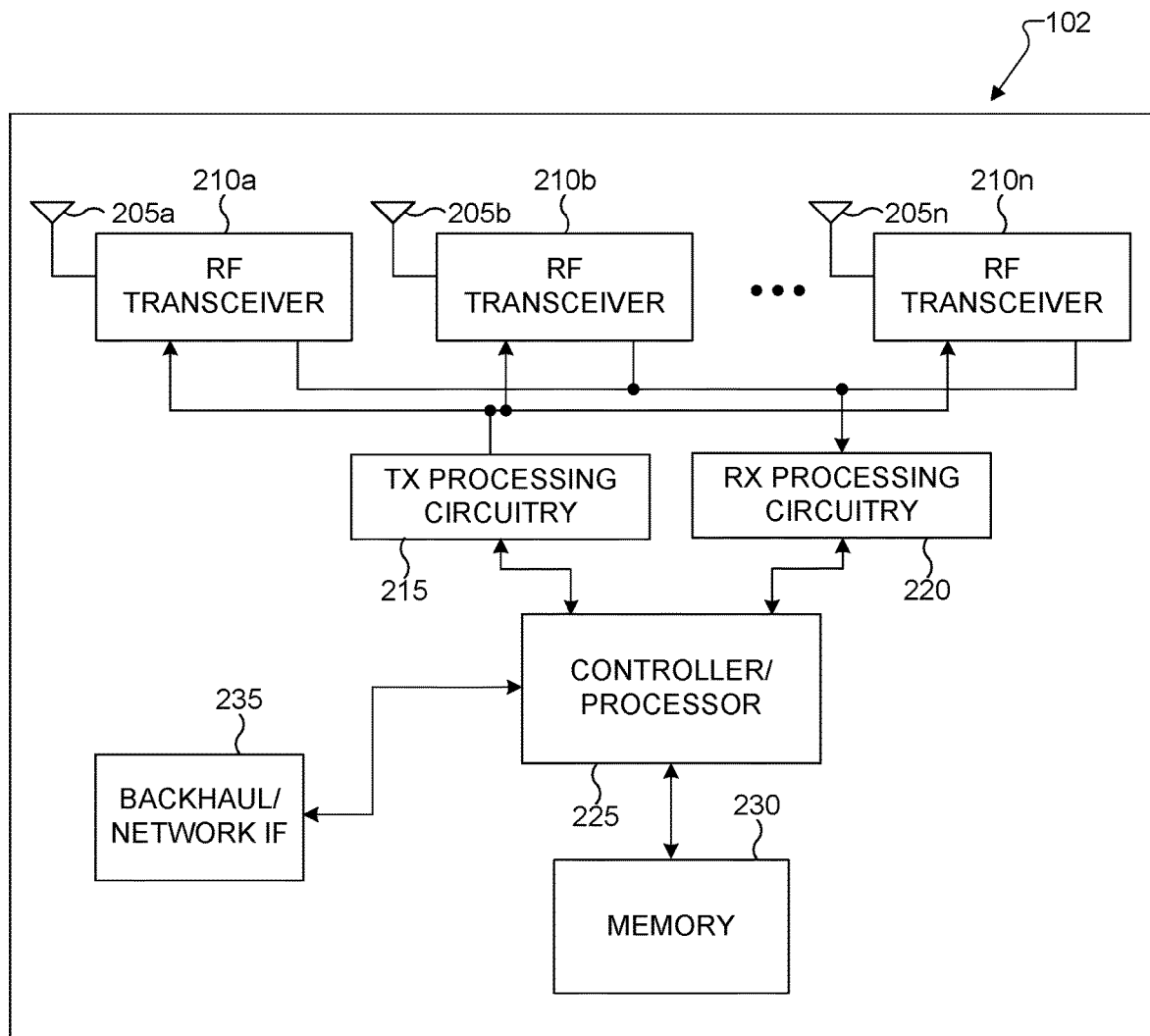
FIG. 2 illustrates an example gNB according to embodiments of the present disclosure.
Figure 3:
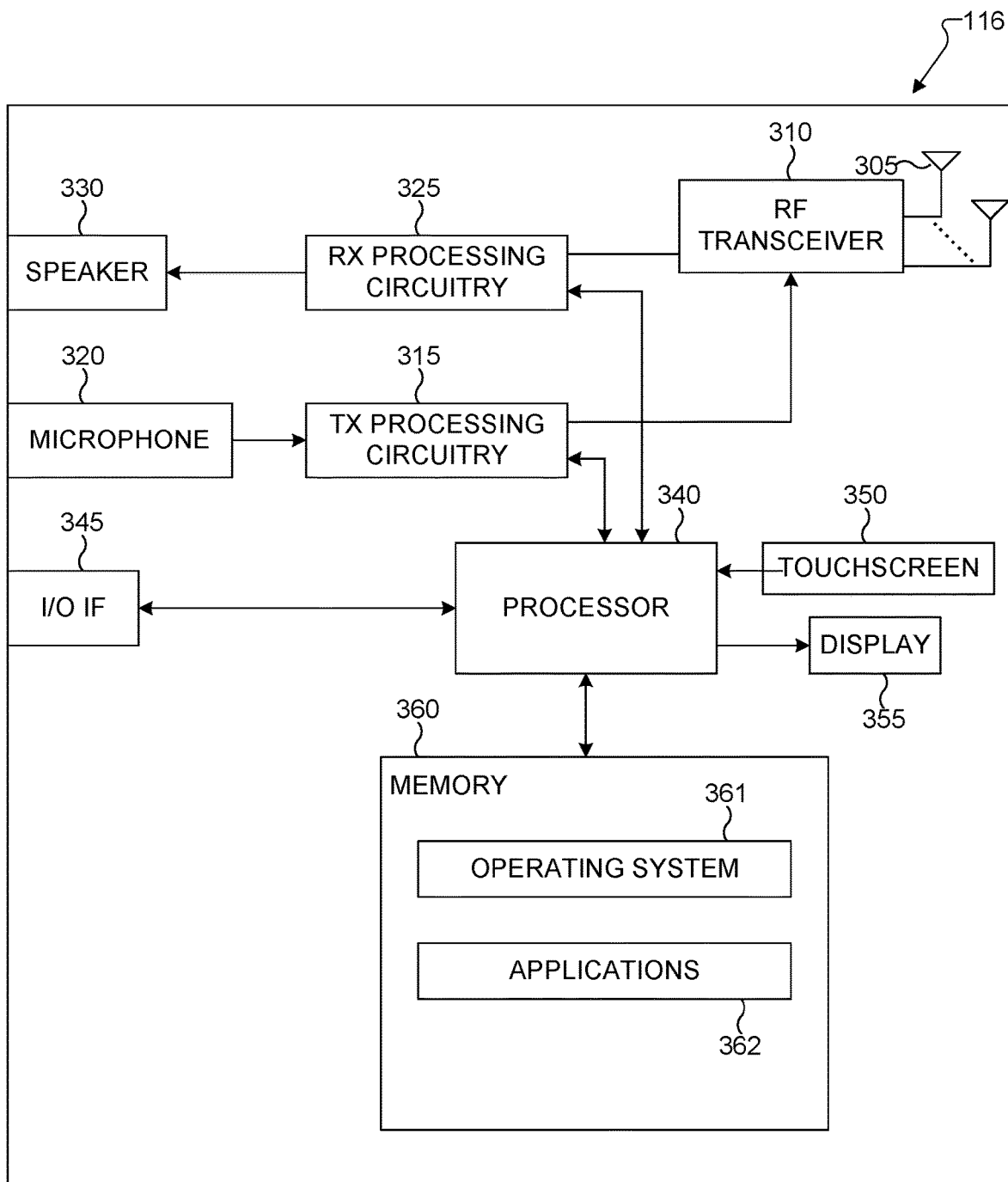
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving a configuration via a radio resource control (RRC) message, the configuration including information about a channel state information reference signal (CSI-RS) burst comprising B>1 time instances of CSI-RS transmission; measuring the CSI-RS burst; determining, based on the measurement, time-domain (TD) or Doppler domain (DD) components of a downlink (DL) channel; and transmitting a CSI report including an indication about the TD or DD components of the DL channel. One or more of the gNBs 101-103 includes circuitry, programing, or a combination thereof, for generating a configuration, the configuration including information about a channel state information reference signal (CSI-RS) burst comprising B>1 time instances of CSI-RS transmission; transmitting the configuration via a radio resource control (RRC) message; transmitting the CSI-RS burst; and receiving a CSI report; wherein the CSI report includes an indication about time-domain (TD) or Doppler domain (DD) components of a downlink (DL) channel, and wherein the TD or DD components of the DL channel are based on the CSI-RS burst.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving a configuration via a radio resource control (RRC) message, the configuration including information about a channel state information reference signal (CSI-RS) burst comprising B>1 time instances of CSI-RS transmission; measuring the CSI-RS burst; determining, based on the measurement, time-domain (TD) or Doppler domain (DD) components of a downlink (DL) channel; and transmitting a CSI report including an indication about the TD or DD components of the DL channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
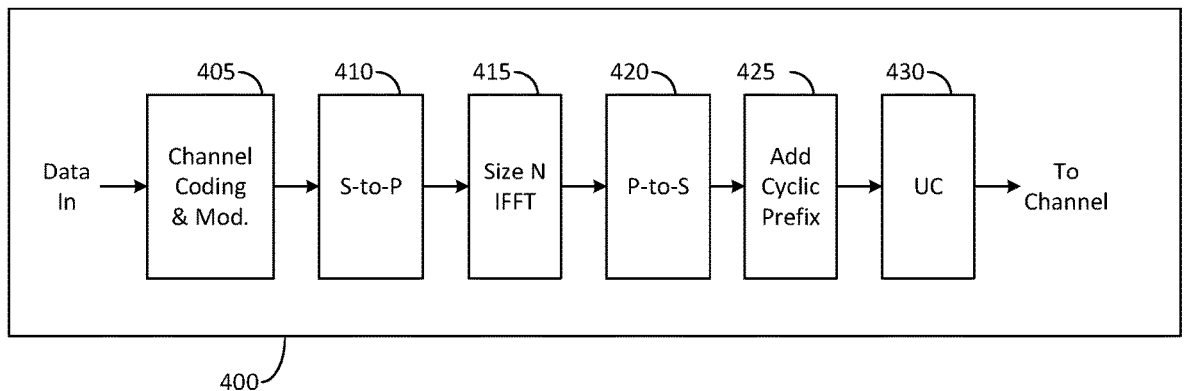
FIG. 4A illustrates a high-level diagram of an orthogonal frequency division multiple access transmit path according to embodiments of the present disclosure.
Figure 4B:
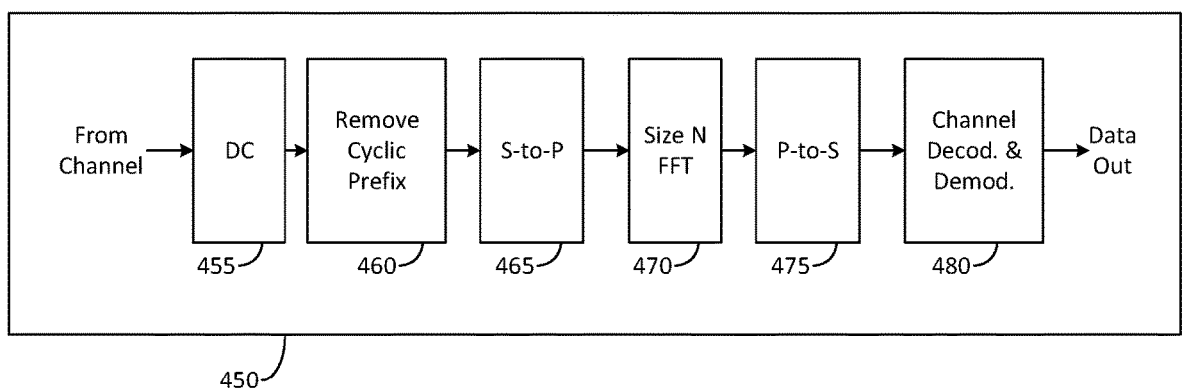
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
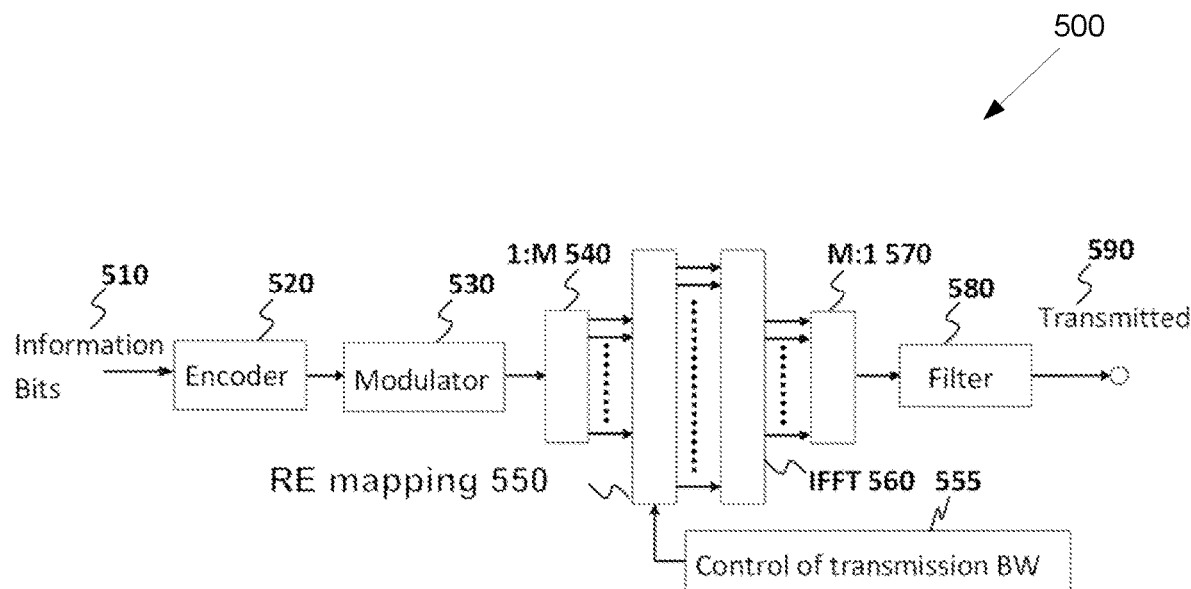
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
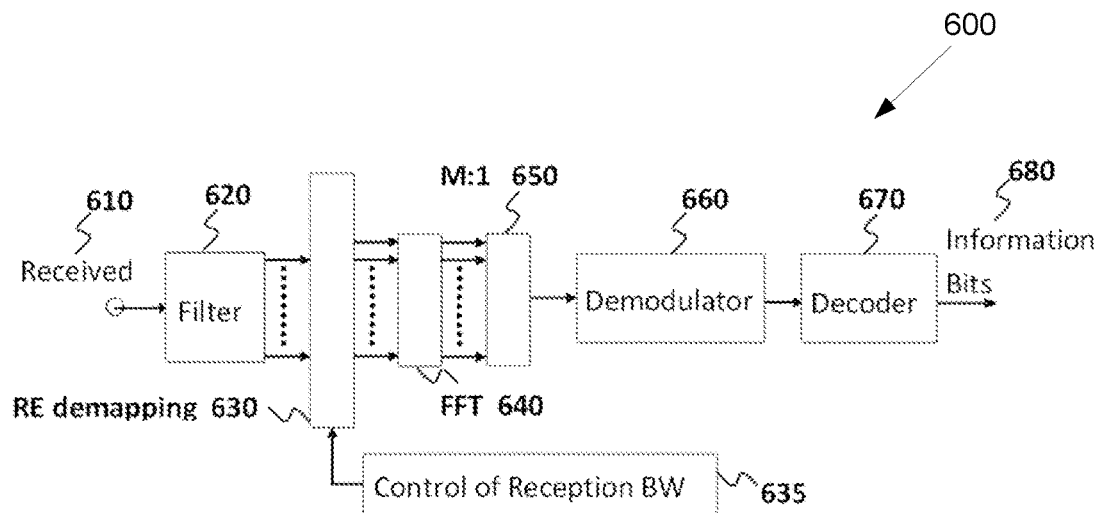
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
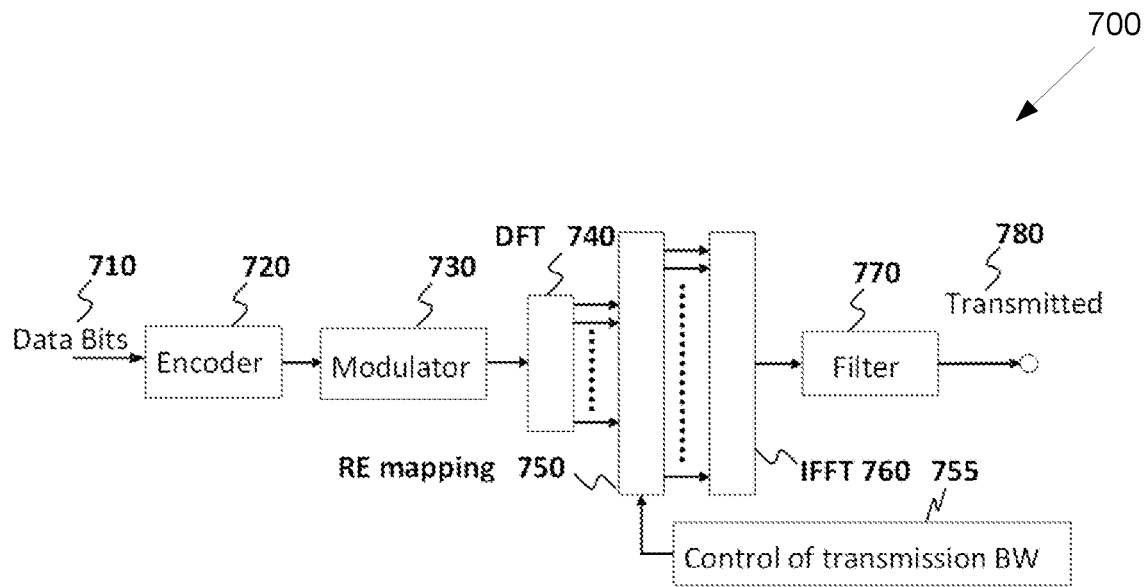
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
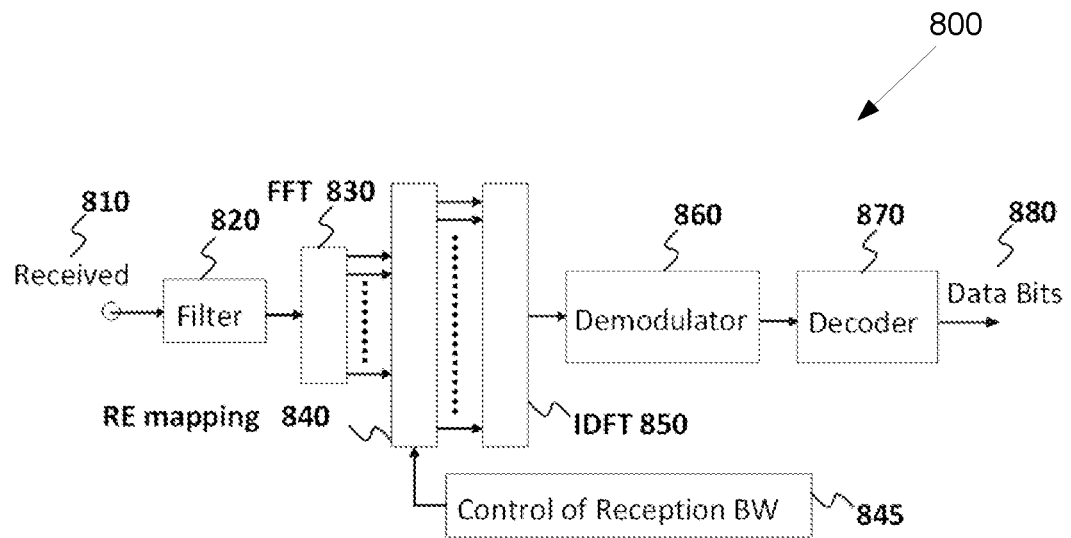
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
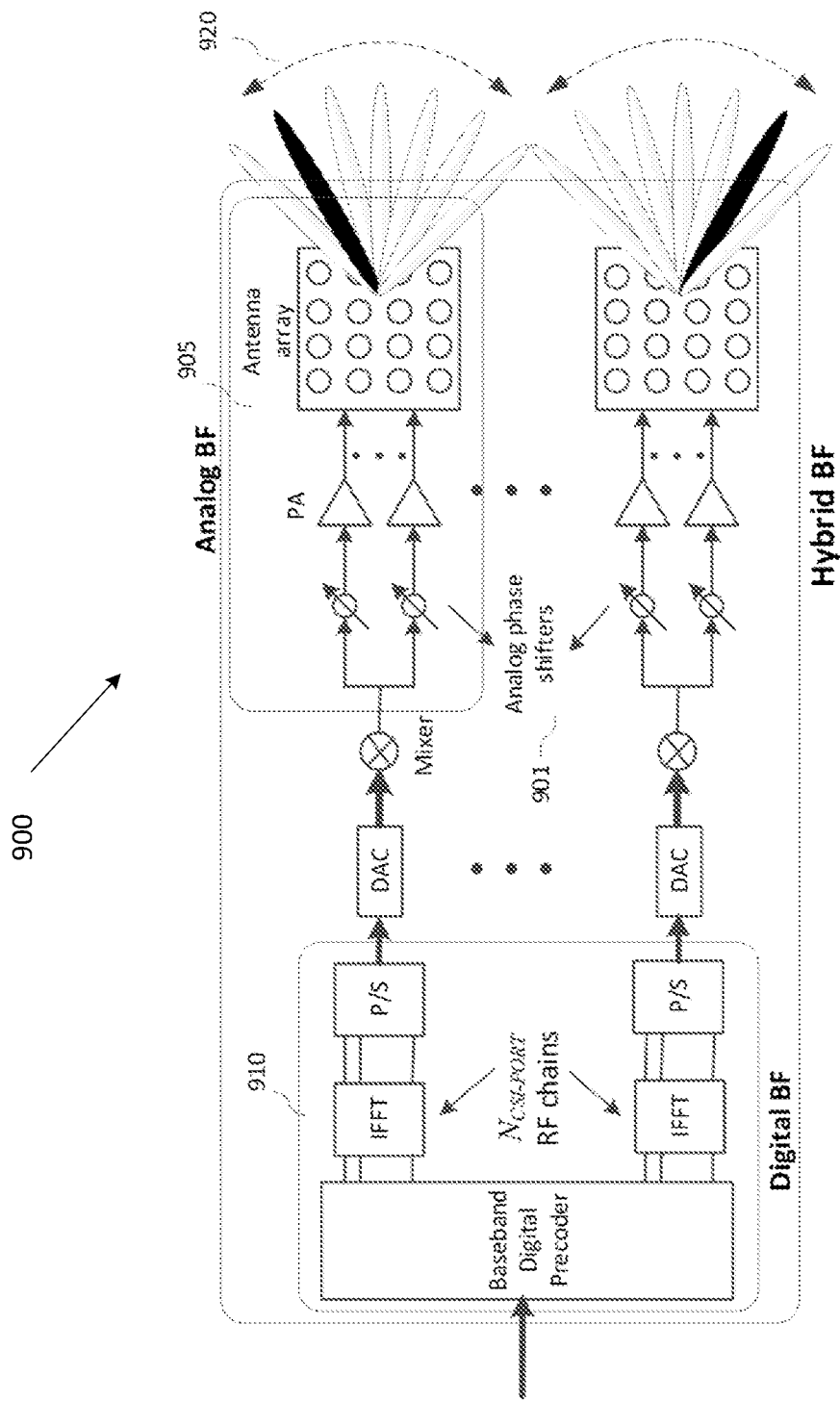
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 1100 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. The overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

It has been known in the literature that UL-DL channel reciprocity exists in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and/or DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17 NR, such a codebook will be supported.

Figure 10:
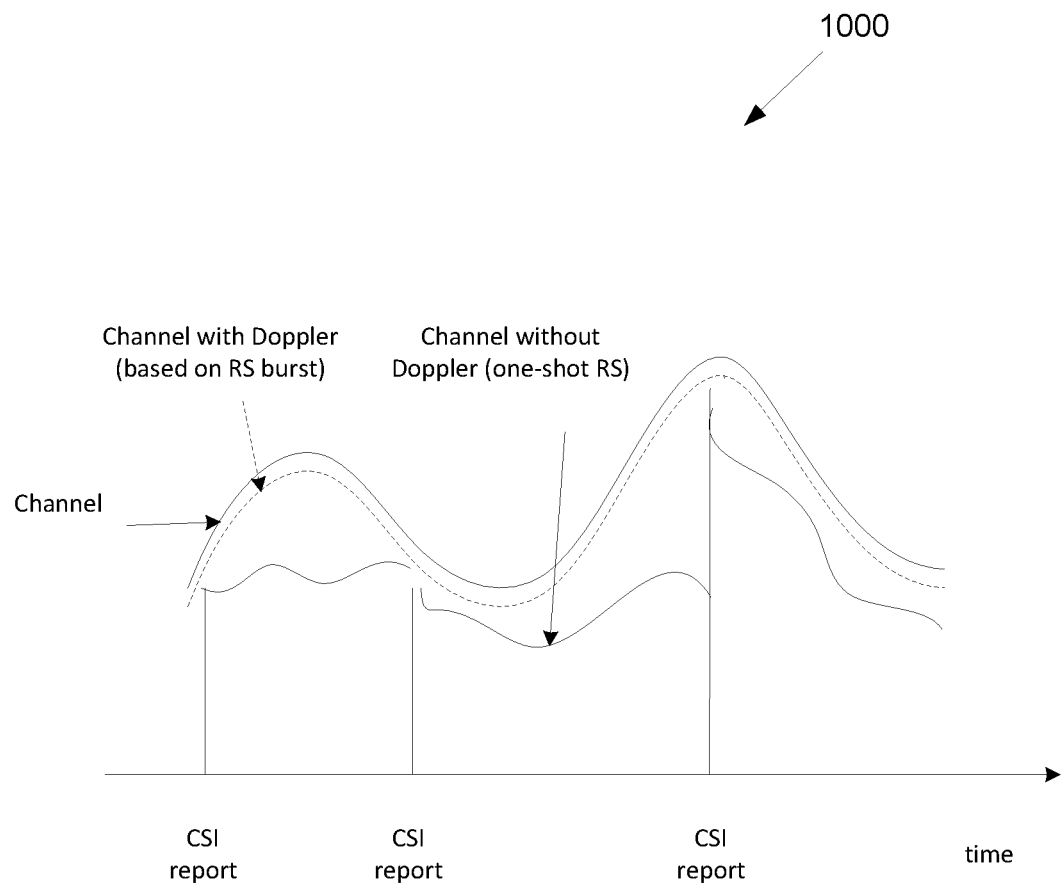
FIG. 10 illustrates channel measurements with and without Doppler components according to embodiments of the present disclosure.

FIG. 10 illustrates channel measurement with and without Doppler components 1000 according to embodiments of the present disclosure. The embodiment of the channel measurement with and without Doppler components 1000 illustrated in FIG. 10 is for illustration only. FIG. 10 does not limit the scope of this disclosure to any particular implementation of the channel measurement with and without Doppler components 1000.

Now, when the UE speed is in a moderate or high speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Or, the gNB can use the obtained Doppler components of the UL channel to beamform CSI-RS for CSI reporting by the UE. An illustration of channel measurement with and without Doppler components is shown in FIG. 10. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

As described, measuring an RS burst is needed in order to obtain the Doppler components of the channel. This disclosure provides several example embodiments on mechanisms related to measuring an RS (e.g., CSI-RS or SRS) burst.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 11:
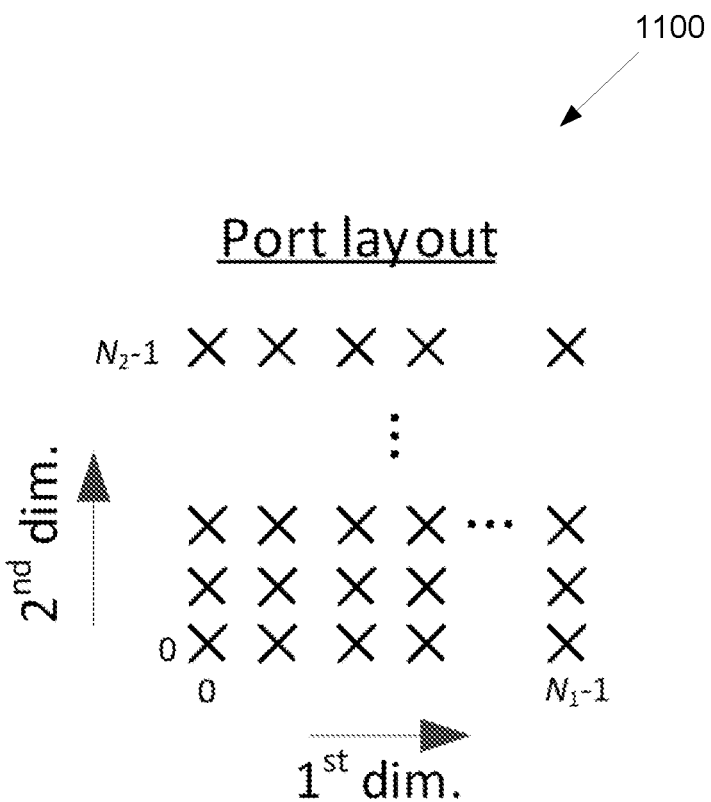
FIG. 11 illustrates an antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 12:
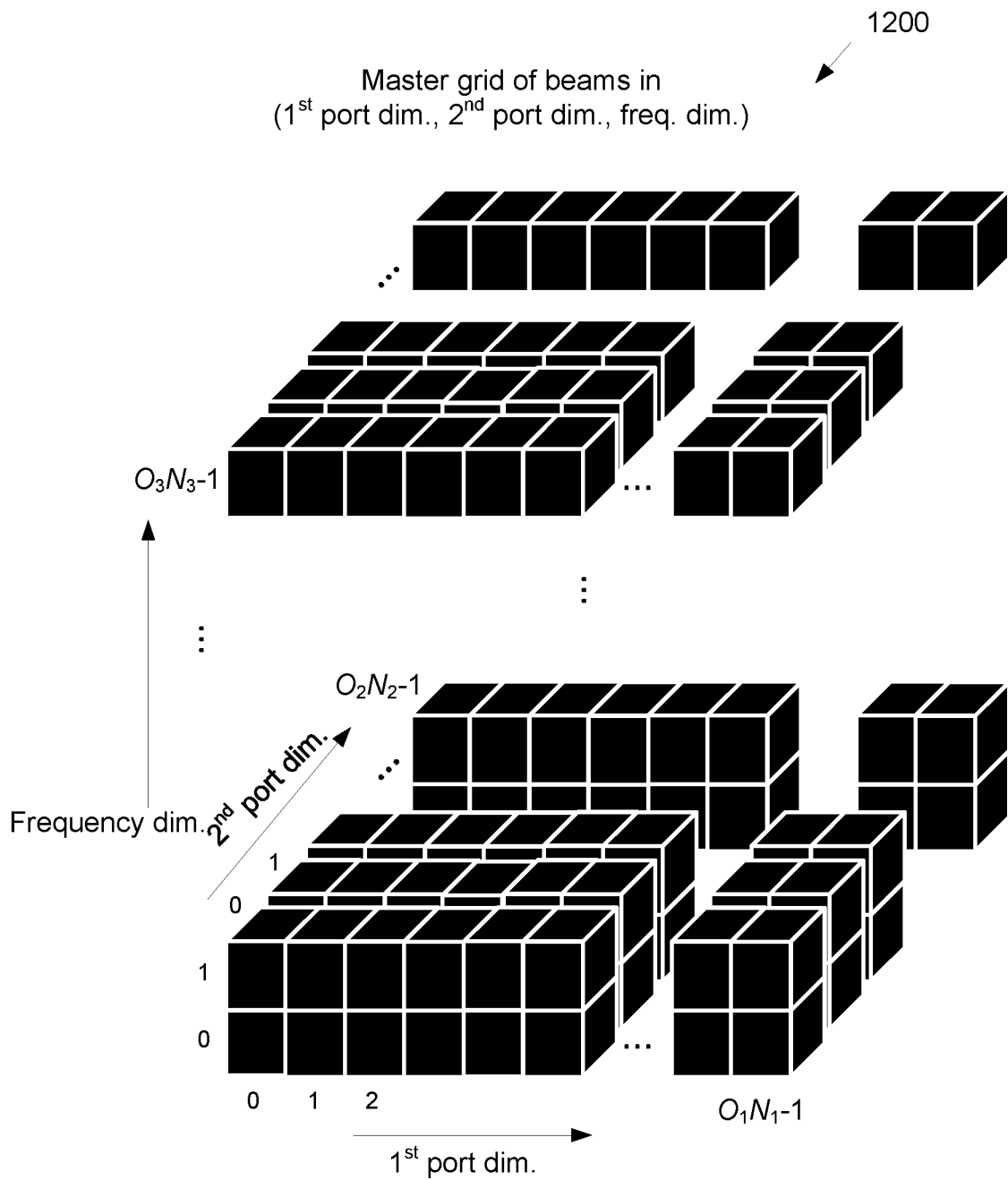
FIG. 12 illustrates a 3D grid of oversampled DFT beams according to embodiments of the present disclosure.

FIG. 12 illustrates a 3D grid 1300 of the oversampled DFT beams (1st port dim., 2nd port dim., freq. dim.) in which 1st dimension is associated with the 1st port dimension,
   2nd dimension is associated with the 2nd port dimension, and
   3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

As explained in Section 5.2.2.2.6 of REFS, a UE is configured with higher layer parameter codebookType set to 'typeII-PortSelection-r16' for an enhanced Type II CSI reporting in which the pre-coders for all SBs and for a given layer l=1, ..., v, where v is the associated RI value, is given by either $$W^l = AC_l B^H = \qquad (Eq. 1)$$

$$[a_0 \; a_1 \; \ldots \; a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \; b_1 \; \ldots \; b_{M-1}]^H =$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H), \text{ or}$$

$$W^l = \begin{bmatrix} A & 0 \\ 0 & A \end{bmatrix} C_l B^H = \begin{bmatrix} a_0 \; a_1 \; \ldots \; a_{L-1} & 0 \\ 0 & a_0 \; a_1 \; \ldots \; a_{L-1} \end{bmatrix} \qquad (Eq. 2)$$

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \; b_1 \; \ldots \; b_{M-1}]^H =$$

$$\begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where
- $N_1$ is a number of antenna ports in a first antenna port dimension (having the same antenna polarization),
- $N_2$ is a number of antenna ports in a second antenna port dimension (having the same antenna polarization),
- $P_{CSI-RS}$ is a number of CSI-RS ports configured to the UE,
- $N_3$ is a number of SBs for PMI reporting or number of FD units or number of FD components (that comprise the CSI reporting band) or a total number of precoding matrices indicated by the PMI (one for each FD unit/component),
- $a_i$ is a $2N_1N_2 \times 1$ (Eq. 1) or $N_1N_2 \times 1$ (Eq. 2) column vector, and $a_i$ is a $N_1N_2 \times 1$ or $$\frac{P_{CSIRS}}{2} \times 1$$

port selection column vector if antenna ports at the gNB are co-polarized, and is a $2N_1N_2 \times 1$ or $P_{CSIRS} \times 1$ port selection column vector if antenna ports at the gNB are dual-polarized or cross-polarized, where a port selection vector is a defined as a vector which contains a value of 1 in one element and zeros elsewhere, and $P_{CSIRS}$ is the number of CSI-RS ports configured for CSI reporting,
- $b_f$ is a $N_3 \times 1$ column vector,
- $c_{l,i,f}$ is a complex coefficient associate with vectors $a_i$ and $b_f$.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$, where $x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \text{ and} \qquad (Eq. 3)$$

$$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{=0}^{M_i-1} c_{l,i+L,f}(a_i b_{i,f}^H) \end{bmatrix}, \qquad (Eq. 4)$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} [W^1 \; W^2 \; \ldots \; W^R].$$

Eq. 2 is assumed in the rest of the disclosure. The embodiments of the disclosure, however, are general and are also application to Eq. 1, Eq. 3 and Eq. 4.

Here $$L \leq \frac{P_{CSI-RS}}{2} \text{ and } M \leq N_3. \text{ If } L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2 n_{3,l}^{(f)}}{O_3 N_3}} & \ldots & e^{j\frac{2\pi (N_3-1) n_{3,l}^{(f)}}{O_3 N_3}} \end{bmatrix}^T.$$

When $O_3=1$, the FD basis vector for layer $l \in \{1, \ldots, v\}$ (where v is the RI or rank value) is given by $$w_f = \begin{bmatrix} y_{0,l}^{(f)} & y_{1,l}^{(f)} & \ldots & y_{N_3-1,l}^{(f)} \end{bmatrix}^T, \text{ where}$$

$$y_{t,l}^{(f)} = e^{j\frac{2\pi t n_{3,l}^{(f)}}{N_3}} \text{ and } n_{3,l} = [n_{3,l}^{(0)}, \ldots, n_{3,l}^{(M-1)}] \text{ where}$$

$$n_{3,l}^{(f)} \in \{0, 1, \ldots, N_3-1\}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases}, \text{ and}$$

$K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \qquad (5)$$

where $A = W_1$ corresponds to the Rel. 15 $W_1$ in Type II CSI codebook [REF8], and $B = W_f$.

The $C_l = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $p_{l,i,f} = p_{l,i,f}^{(1)} p_{l,i,f}^{(2)}$ where $p_{l,i,f}^{(1)}$ is a reference or first amplitude which is reported using a A1-bit amplitude codebook where A1 belongs to {2, 3, 4}, and $p_{l,i,f}^{(2)}$ is a differential or second amplitude which is reported using a A2-bit amplitude codebook where A2≤A1 belongs to {2, 3, 4}.

For layer 1, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$ A X-bit indicator for the strongest coefficient index (i*, f*), where $X = \lceil \log_2 K_{NZ} \rceil$ or $\lceil \log_2 2L \rceil$.

Strongest coefficient $c_{l,i^*,f^*} = 1$ (hence its amplitude/phase are not reported)

Two antenna polarization-specific reference amplitudes is used.

For the polarization associated with the strongest coefficient $c_{l,i^*,f^*} = 1$, since the reference amplitude $p_{l,i,f}^{(1)} = 1$, is not reported)

For the other polarization, reference amplitude $p_{l,i,f}^{(1)}$ is quantized to 4 bits The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}\right\}.$$

For $\{c_{l,i,f}, (i,f) \neq (i^*, f^*)\}$:

For each polarization, differential amplitudes $p_{l,i,f}^{(2)}$ of the coefficients calculated relative to the associated polarization-specific reference amplitude and quantized to 3 bits The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,f}$ is given by $p_{l,i,f}^{(1)} \times p_{l,i,f}^{(2)}$ Each phase is quantized to either 8PSK ($N_{ph} = 8$) or 16PSK ($N_{ph} = 16$) (which is configurable).

For the polarization $r^* \in \{0,1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)} = p_{l,r^*}^{(1)} = 1$. For the other polarization $r \in \{0,1\}$ and $r \neq r^*$, we have $$r = \left(\left\lfloor \frac{i^*}{L} \right\rfloor + 1\right)$$

mod 2 and the reference amplitude $p_{l,i,f}^{(1)} = p_{l,r}^{(1)}$ is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from {1,2} and p is higher-layer configured from {¼, ½}. In one example, the p value is higher-layer configured for rank 1-2 CSI reporting. For rank >2 (e.g., rank 3-4), the p value (denoted by $v_0$) can be different. In one example, for rank 1-4, (p,$v_0$) is jointly configured from $$\left\{\left(\frac{1}{2}, \frac{1}{4}\right), \left(\frac{1}{4}, \frac{1}{4}\right), \left(\frac{1}{4}, \frac{1}{8}\right)\right\}, \text{ i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In the rest of the disclosure, M is replaced with $M_v$ to show its dependence on the rank value v, hence p is replaced with $p_v$, $v \in \{1,2\}$ and $v_0$ is replaced with $p_v$, $v \in \{3,4\}$.

A UE can be configured to report $M_v$ FD basis vectors in one-step from $N_3$ basis vectors freely (independently) for each layer $l \in \{0, 1, \ldots, v-1\}$ of a rank v CSI reporting.

Alternatively, a UE can be configured to report $M_v$ FD basis vectors in two-step as follows.

In step 1, an intermediate set (InS) comprising $N'_3 < N_3$ basis vectors is selected/reported, wherein the InS is common for all layers.

In step 2, for each layer $l \in \{0, 1, v-1\}$ of a rank v CSI reporting, M FD basis vectors are selected/reported freely (independently) from $N'_3$ basis vectors in the InS.

In one example, one-step method is used when $N_3 \leq 19$ and two-step method is used when $N_3 > 19$. In one example, $N'_3 = \lceil \alpha M \rceil$ where $\alpha > 1$ is either fixed (to 2 for example) or configurable.

The codebook parameters used in the DFT based frequency domain compression (eq. 5) are (L, $p_v$ for $v \in \{1,2\}$, $p_v$ for $v \in \{3,4\}$, $\beta$, $\alpha$, $N_{ph}$). In one example, the set of values for these codebook parameters are as follows.

L: the set of values is $\{2,4\}$ in general, except $L \in \{2,4,6\}$ for rank 1-2, 32 CSI-RS antenna ports, and R=1.

($p_v$ for $v \in \{1,2\}$, $p_v$ for $v \in \{3,4\}$) $\in \{(\frac{1}{2}, \frac{1}{4}), (\frac{1}{4}, \frac{1}{4}), (\frac{1}{4}, \frac{1}{8})\}$.

$\beta \in \{\frac{1}{4}, \frac{1}{2}, \frac{3}{4}\}$.

$\alpha \in \{1.5, 2, 2.5, 3\}$ $N_{ph} \in \{8, 16\}$.

In another example, the set of values for these codebook parameters are as follows: $\alpha=2$, $N_{ph}=16$, and as in Table 1, where the values of L, $\beta$ and $p_v$ are determined by the higher layer parameter paramCombination-r17. In one example, the UE is not expected to be configured with paramCombination-r17 equal to 3, 4, 5, 6, 7, or 8 when $P_{CSI-RS}=4$, 7 or 8 when number of CSI-RS ports $P_{CSI-RS} < 32$, 7 or 8 when higher layer parameter typeII-RI-Restriction-r17 is configured with $r_i=1$ for any $i>1$, 7 or 8 when R=2.

The bitmap parameter typeII-RI-Restriction-r17 forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with v=i+1 layers. The parameter R is configured with the higher-layer parameter numberOfPMISubbandsPerCQISubband-r17. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part.

TABLE 1

| paramCombination -r17 | L | $p_v$ $v \in \{1, 2\}$ | $p_v$ $v \in \{3, 4\}$ | $\beta$ |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

The above-mentioned framework (equation 5) represents the precoding-matrices for multiple ($N_3$) FD units using a linear combination (double sum) over 2L SD beams and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \quad \text{(equation 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The abovementioned framework for CSI reporting based on space-frequency compression (equation 5) or space-time compression (equation 5A) frameworks can be extended to Doppler domain (e.g., for moderate to high mobility UEs). This disclosure focuses on a reference signal burst that can be used to obtain Doppler component(s) of the channel, which can be used to perform Doppler domain compression.

Figure 13:
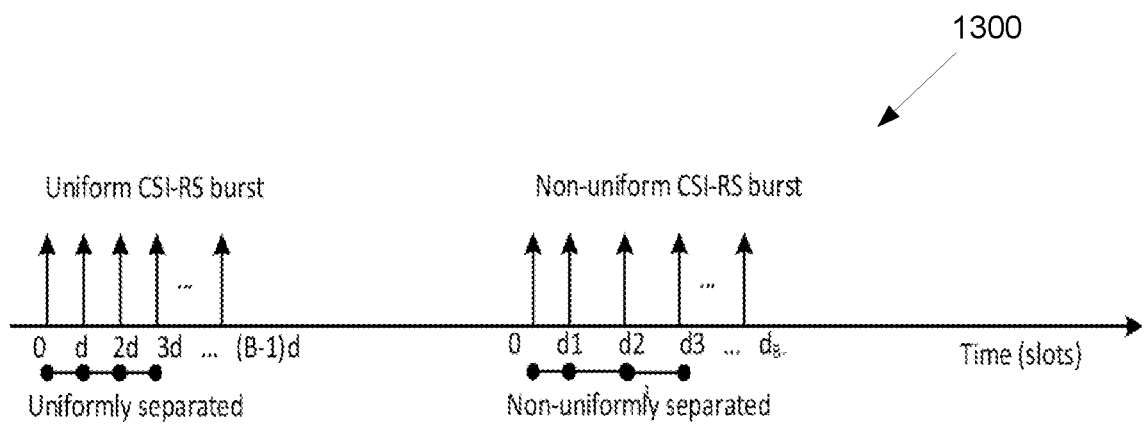
FIG. 13 illustrates an example of a UE configured to receive a burst of NZP CSI-RS resources according to embodiments of the present disclosure.

FIG. 13 illustrates an example of a UE configured to receive a burst of non-zero power (NZP) CSI-RS resource(s) 1300 according to embodiments of the present disclosure. The embodiment of the UE configured to receive the burst of NZP CSI-RS resource(s) 1300 illustrated in FIG. 13 is for illustration only. FIG. 13 does not limit the scope of this disclosure to any particular implementation of the UE configured to receive a burst of NZP CSI-RS resource(s) 1300.

In one embodiment I.1, as shown in FIG. 13, a UE is configured to receive a burst of non-zero power (NZP) CSI-RS resource(s), referred to as CSI-RS burst for brevity, in B time slots, where $B \geq 1$. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1 = d_1$, $e_2 = d_2 - d_1$, $e_3 = d_3 - d_2, \ldots$, so on, where $e_i \neq e_j$ for at least one pair (i,j) with $i \neq j$.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0, 1, \ldots, B-1\}$. When the DL channel estimate in slot t is a matrix $G_t$ of size $N_{Rx} \times N_{Tx} \times N_{Sc}$, then $h_t = \text{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→and so on, implying that the concatenation starts from the first dimension, then moves second dimension, and continues until the last dimension. Let $H_B = [h_0 \; h_1 \; \ldots \; h_{B-1}]$ be a concatenated DL channel. The Doppler component(s) of the DL channel can be obtained based on $H_B$. For example, $H_B$ can be represented as $C\Phi^H = \sum_{s=0}^{N-1} c_s \phi_s^H$ where $\Phi = [\phi_0 \; \phi_1 \; \ldots \; \phi_{N-1}]$ is a Doppler domain (DD) basis matrix whose columns comprise basis vectors, $C = [c_0 \; c_1 \; \ldots \; c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix $\Phi$ and the coefficient matrix C.

In one example I.1.1, the value B can be fixed or configured (e.g., via higher layer RRC or/and MAC CE based signaling). Or, the value B is reported by the UE as part of a CSI report. Or, the value B can be reported by the UE as part of a capability reporting. When B is configured, it can be subject to the capability reporting about B. The value B can also depend on the dimension of the DD basis vectors.

In one embodiment I.2, analogously, for UL, the UE can be configured to transmit a burst of SRS resource(s), referred to as SRS burst for brevity, in B' time slots, where B'≥1. The B' time slots can also be either uniformly spaced or non-uniformly spaced. The gNB receives the SRS burst, estimates the B' instances of the UL channel measurements, and uses the channel estimates to obtain the Doppler component(s) of the UL channel. For instance, the method explained above can be used.

In one example I.2.1, the value B' can be fixed or configured (e.g., via higher layer RRC or/and MAC CE based signaling). Or, the value B' is reported by the UE as part of a CSI report. Or, the value B' can be reported by the UE as part of a capability reporting. When B' is configured, it can be subject to the capability reporting about B'. The value B' can also depend on the dimension of the DD basis vectors.

In one embodiment I.3, When DL and UL channels are reciprocal (for example, when the system is TDD), then the Doppler component(s) of the DL channel can be obtained by the gNB based on an SRS burst measurement, and likewise, the Doppler component(s) of the UL channel can be obtained by the UE based on a CSI-RS burst measurement. When DL and UL channels are partially reciprocal (for example, when the system is FDD but the DL-UL duplexing distance is small), then some (partial) information about the Doppler component(s) of the DL channel can be obtained by the gNB based on an SRS burst measurement, and likewise, some (partial) information about the Doppler component(s) of the UL channel can be obtained by the UE based on a CSI-RS burst measurement.

Optionally, for both reciprocal and partially reciprocal cases, a combination of CSI-RS burst and SRS burst can be used to acquire the Doppler component(s) of the DL or/and UL channels.

In one example I.3.1, When a combination of CSI-RS and SRS bursts are used/configured, then at least one of the following is used to determine the value of B and B'.
  In one example, B=B', and the value of B is determined according to example I.1.1.
  In one example, B depends on B', and the value of B' is determined according to example I.2.1. The relation between B and B' can be pre-determined or configured (e.g., via higher layer).
  In one example, B' depends on B, the value of B is determined according to example I.1.1. The relation between B and B' can be pre-determined or configured (e.g., via higher layer).
  In one example, B and B' are separately (independently) determined. The value of B is determined according to example I.1.1, and the value of B' is determined according to example I.2.1.

In the rest of the disclosure, example signaling mechanisms for a CSI-RS burst, or a SRS burst, or a combination of CSI-RS and SRS burst are proposed.

In one embodiment I.4, the Doppler domain (DD) compression can be considered together with at least one of or both of the frequency domain (FD) and spatial domain (SD) compression in order to determine the CSI report. At least one of the following examples can be used/configured.

In one example I.4.1, the CSI reporting is determined based on a combination of DD and FD compression. The compression can be achieved via a separate DD and FD basis matrices, $W_d$ and $W_f$, respectively, the matrix $W_d$ comprising DD basis vectors of length $N_d$, and the matrix $W_f$ comprising FD basis vectors of length $N_f$. Or, the compression can be achieved via a joint (DD, FD) basis matrix $W_{d,f}$ comprising joint (DD-FD) basis vectors of length $N_d \times N_f$. Here, $N_d$ and $N_f$ are dimensions associated with DD and FD, respectively.

In one example I.4.2, the CSI reporting is determined based on a combination of DD and SD compression. The compression can be achieved via a separate DD and SD basis matrices, $W_d$ and $W_s$, respectively, the matrix $W_d$ comprising DD basis vectors of length $N_d$, and the matrix $W_s$ comprising SD basis vectors of length $N_s$. Or, the compression can be achieved via a joint (DD, SD) basis matrix $W_{d,s}$ comprising joint (DD-SD) basis vectors of length $N_d \times N_s$. Here, $N_d$ and $N_s$ are dimensions associated with DD and FD, respectively. In one example, $W_s = W_1$, similar to Rel. 15/16 Type II codebooks. In one example, $N_d = N_1 N_2$, similar to Rel. 15/16 Type II codebook.

In one example I.4.3, the CSI reporting is determined based on a combination of DD, SD, and FD compression. At least one of the following examples can be used/configured.
  In one example, the compression can be achieved via a separate DD, SD, and FD basis matrices, $W_d$, $W_s$, and $W_f$, which are defined above.
  In one example, the compression can be achieved via a joint (DD, FD) basis matrix $W_{d,f}$ and a separate SD basis matrix $W_s$, which are defined above.
  In one example, the compression can be achieved via a joint (DD, SD) basis matrix $W_{d,s}$ and a separate SD basis matrix $W_f$, which are defined above.
  In one example, the compression can be achieved via a joint (SD, FD) basis matrix $W_{s,f}$ and a separate DD basis matrix $W_d$, which are defined above.
  In one example, the compression can be achieved via a joint (DD, SD, FD) basis matrix $W_{d,s,f}$ comprising joint (DD, SD, FD) basis vectors of length $N_d \times N_s \times N_f$.

In one embodiment II.1, a UE is configured (via higher layer) with CSI resource setting(s) comprising (one or multiple sets of) semi-persistent (SP) CSI-RS resource(s) for channel measurement (CMR resources). The CSI resource setting(s) may also include (one or multiple sets of) CSI-IM/CSI-RS resource(s) for interference measurement (IMR resources). The UE is configured to receive a CSI-RS burst based on a MAC CE or/and DCI based activation or/and deactivation of a SP CSI-RS resource. The periodicity and the slot offset of an activated SP CSI-RS resource is configured via higher layer parameter periodicityAndOffset. Once activated, a SP CSI-RS resources acts like a periodic CSI-RS resource, hence, it can be used as a uniformly separated CSI-RS burst. The CSI-RS burst (based on a SP CSI-RS resource) can be linked to (or associated with) a single CSI reporting setting (e.g., via higher layer parameter CSI-ReportConfig).

At least one of the following examples is used/configured.

Figure 14:
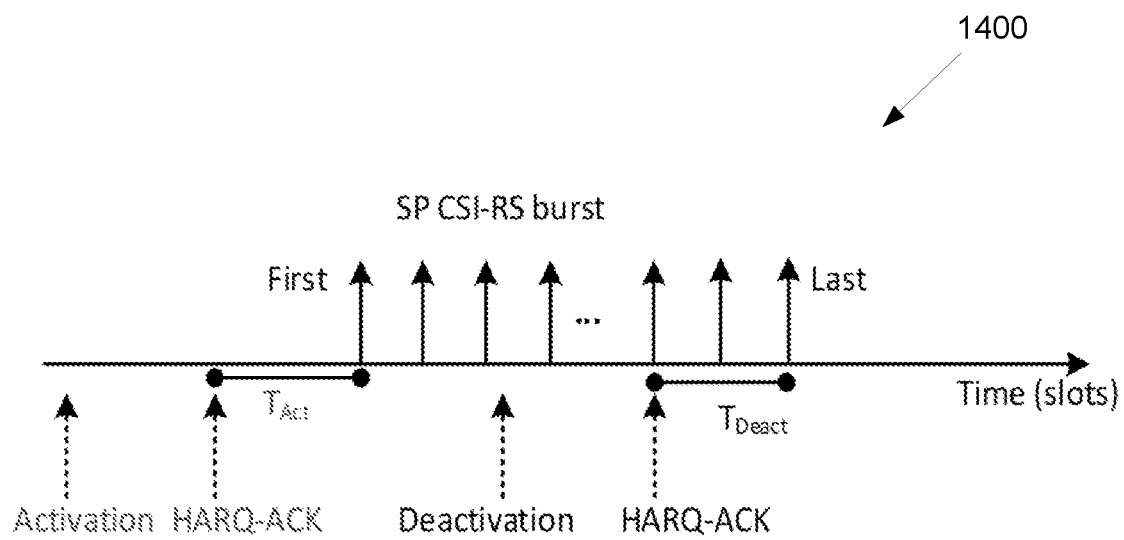
FIG. 14 illustrates an example of a UE configured to receive a CSI-RS burst based on a MAC CE based activation and deactivation of a SP CSI-RS resource according to embodiments of the present disclosure.

FIG. 14 illustrates an example of a UE configured to receive a CSI-RS burst based on a MAC CE based activation and deactivation of a SP CSI-RS resource 1400 according to embodiments of the present disclosure. The embodiment of the UE configured to receive a CSI-RS burst based on a MAC CE based activation and deactivation of a SP CSI-RS resource 1400 illustrated in FIG. 14 is for illustration only. FIG. 14 does not limit the scope of this disclosure to any particular implementation of the UE configured to receive a CSI-RS burst based on a MAC CE based activation and deactivation of a SP CSI-RS resource 1400.

In one example II.1.1, the UE is configured to receive a CSI-RS burst based on a MAC CE based activation and deactivation of a SP CSI-RS resource. That is, the UE receives a MAC CE activation command that activates (starts reception of) a SP CSI-RS resource from the configured SP CSI-RS resource(s), and the UE receives a MAC CE deactivation command that deactivates (ends reception of) the SP CSI-RS resource. The activation and deactivation commands are received via respective (two) PDSCHs, and the UE transmits a PUCCH with HARQ-ACK corresponding to each PDSCH. The first and the last instances of the SP CSI-RS resource receptions are after a time duration from the corresponding HARQ-ACK transmissions. This is illustrated in FIG. 14, where $T_{Act}$ is the time duration (#slots) between HARQ-ACK corresponding to the activation command, and $T_{Deact}$ is the time duration (#slots) between HARQ-ACK corresponding to the deactivation command. In one example, $T_{Act}=n_{Act}+3N_{slot}^{subframe, \mu}$, and $T_{Deact}=n_{Deact}+3N_{slot}^{subframe, \mu}$ where $\mu$ is the SCS configuration for the PUCCH, $N_{Act}$ is the slot number in which HARQ-ACK corresponding of activation is transmitted, $n_{Deact}$ is the slot number in which HARQ-ACK corresponding of deactivation is transmitted, and $N_{slot}^{subframe, \mu}$ is the number of slots in a subframe corresponding to the SCS $\mu$.

The value of B (length of a CSI-RS burst) can be determined based on the number of instances (slots), $\tilde{B}$, between the first and the last instances of SP CSI-RS resource reception. In one example, $\tilde{B}=B$.

Figure 15:
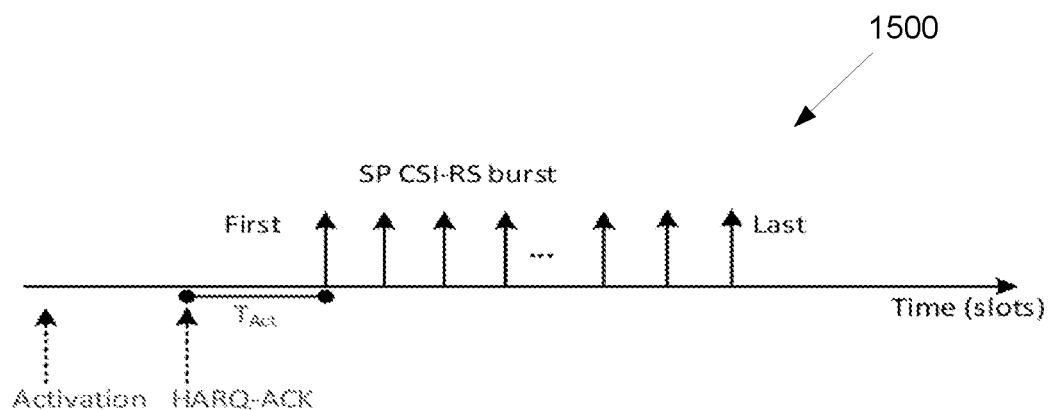
FIG. 15 illustrates an example of a UE configured to receive a CSI-RS burst based on a MAC CE based activation of a SP CSI-RS resource according to embodiments of the present disclosure.

FIG. 15 illustrates an example of a UE configured to receive a CSI-RS burst based on a MAC CE based activation of a SP CSI-RS resource 1500 according to embodiments of the present disclosure. The embodiment of the UE configured to receive a CSI-RS burst based on a MAC CE based activation of a SP CSI-RS resource 1500 illustrated in FIG. 15 is for illustration only. FIG. 15 does not limit the scope of this disclosure to any particular implementation of the UE configured to receive a CSI-RS burst based on a MAC CE based activation of a SP CSI-RS resource 1500.

In one example II.1.2, which is a variation of example II.1.1, the UE is configured to receive a CSI-RS burst based on a MAC CE based activation of a SP CSI-RS resource. There is no separate signaling for the deactivation command. That is, the UE receives a MAC CE activation command that activates (starts reception of) a SP CSI-RS resource from the configured SP CSI-RS resource(s). The ending (last slot) of an activated SP CSI-RS resource reception can either be fixed, or indicated via the MAC CE that activates the SP CSI-RS resource (either separate or joint CE), or via RRC. The activation command is received via a PDSCH, and the UE transmits a PUCCH with HARQ-ACK corresponding to the PDSCH. The first instance of the SP CSI-RS resource reception is after a time duration from the HARQ-ACK transmission. This is illustrated in FIG. 15, where $T_{Act}$ is the time duration (#slots) between HARQ-ACK corresponding to the activation command. In one example, $T_{Act}=n_{Act}+3N_{slot}^{subframe, \mu}$. The rest of the details in example II.1.1 also apply to this embodiment.

Figure 16:
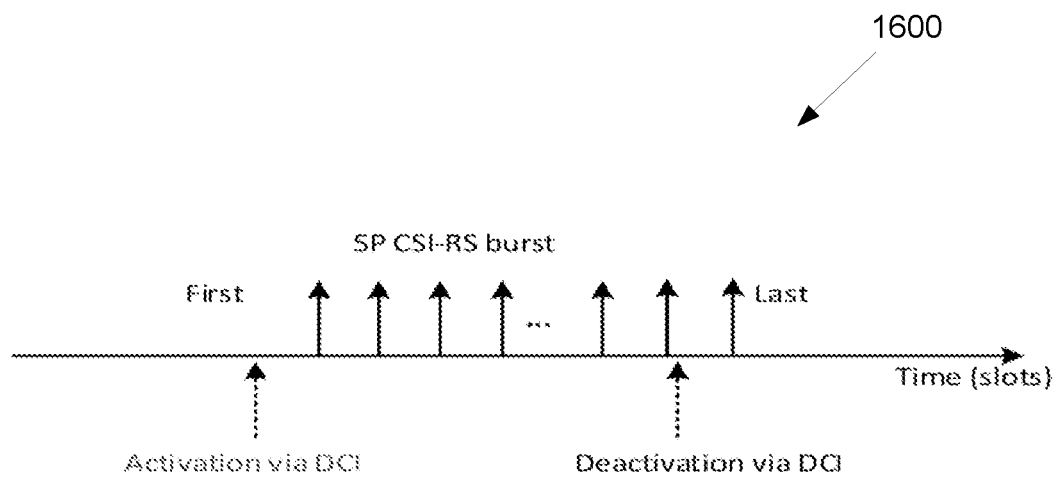
FIG. 16 illustrates a UE configured to receive a CSI-RS burst based on a DCI based triggering/activation and deactivation of a SP CSI-RS resource according to embodiments of the present disclosure.

FIG. 16 illustrates a UE configured to receive a CSI-RS burst based on a DCI based triggering/activation and deactivation of a SP CSI-RS resource 1600 according to embodiments of the present disclosure. The embodiment of the UE configured to receive a CSI-RS burst based on a DCI based triggering/activation and deactivation of a SP CSI-RS resource 1600 illustrated in FIG. 16 is for illustration only. FIG. 16 does not limit the scope of this disclosure to any particular implementation of the UE configured to receive a CSI-RS burst based on a DCI based triggering/activation and deactivation of a SP CSI-RS resource 1600.

In one example II.1.3, as shown in FIG. 16, the UE is configured to receive a CSI-RS burst based on a DCI based triggering/activation and deactivation of a SP CSI-RS resource. That is, the UE receives a triggering/activation message via DCI that triggers/activates (starts reception of) a SP CSI-RS resource from the configured SP CSI-RS resource(s) or from a subset of SP CSI-RS(s) that are selected via MAC CE from the configured SP CSI-RS resource(s). Likewise, the UE receives a deactivation message via another DCI (separate from the triggering DCI) that deactivates (ends reception of) the SP CSI-RS resource.

For SP CSI-RS resource(s) triggered by a DCI, a set of trigger states can be configured via higher layer, where a CSI request field in DCI activates one of the trigger states. The DCI can be scrambled with a RNTI, e.g., SP-CSI-RS-RNTI. A codepoint of the CSI request field in the DCI is mapped to a triggering state according to the order of the positions of the configured set of trigger states, with codepoint '0' mapped to the triggering state in the first position.

The validation of an activation or release/deactivation of a SP CSI-RS resource reception can be according to the procedure described in Section 5.2.1.5.2 of [REFS].

The value of B (length of a CSI-RS burst) can be determined based on the number of instances (slots), $\tilde{B}$, between the first and the last instances of SP CSI-RS resource reception. In one example, $\tilde{B}=B$.

Figure 17:
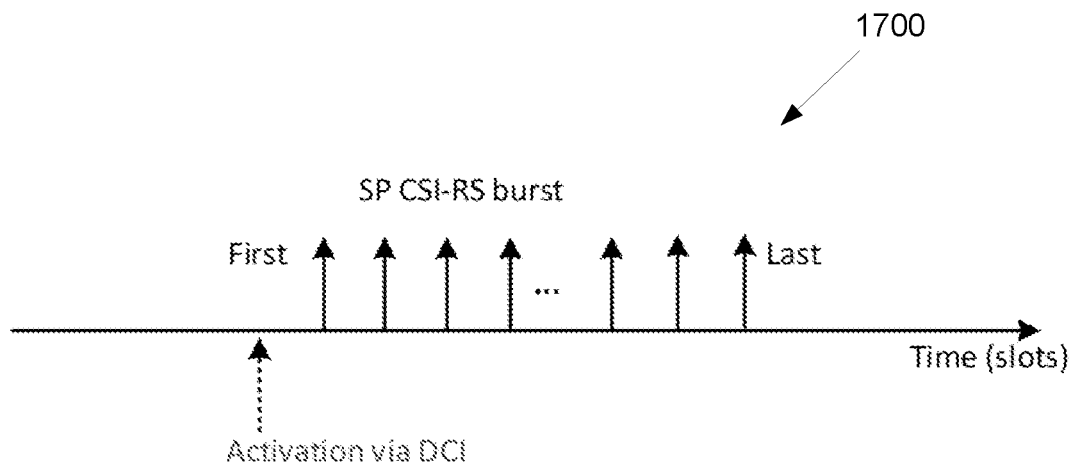
FIG. 17 illustrates a UE configured to receive a CSI-RS burst based on a DCI based triggering/activation of a SP CSI-RS resource according to embodiments of the present disclosure.

FIG. 17 illustrates a UE configured to receive a CSI-RS burst based on a DCI based triggering/activation of a SP CSI-RS resource 1700 according to embodiments of the present disclosure. The embodiment of the UE configured to receive a CSI-RS burst based on a DCI based triggering/activation of a SP CSI-RS resource 1700 illustrated in FIG. 17 is for illustration only. FIG. 17 does not limit the scope of this disclosure to any particular implementation of the UE configured to receive a CSI-RS burst based on a DCI based triggering/activation of a SP CSI-RS resource 1700.

In one example II.1.4, which is a variation of example II.1.3, as shown in FIG. 17, the UE is configured to receive a CSI-RS burst based on a DCI based triggering/activation of a SP CSI-RS resource. There is no separate signaling for the deactivation of an activated SP CSI-RS resource. That is, the UE receives a triggering/activation message via DCI that triggers/activates (starts reception of) a SP CSI-RS resource from the configured SP CSI-RS resource(s) or from a subset of SP CSI-RS(s) that are selected via MAC CE from the configured SP CSI-RS resource(s). The ending (last slot) of an activated SP CSI-RS resource reception can either be fixed, or indicated via the DCI that triggers/activates the SP CSI-RS resource (either separate or joint codepoint is used), or via MAC CE, or via RRC. The rest of the details in example II.1.3 also apply to this embodiment.

In one embodiment II.2, a UE is configured with a CSI-RS burst based on activation and deactivation of a SP CSI-RS resource, as described in examples II.1.1 through II.1.4, where the CSI-RS burst is linked to (or associated with) a CSI reporting setting (e.g., via higher layer parameter CSI-ReportConfig). In one example, the UE receives the CSI-RS burst, estimates the DL channels, and obtains the Doppler component(s) of the channel, as described in embodiment I.1. Then, based on the CSI reporting setting, the UE determines a CSI that includes the Doppler component(s) of the channel, and reports the CSI according to at least one of the following examples.

In one example II.2.1, the time domain behavior of the CSI is configured to be 'aperiodic' (e.g., by the higher layer parameter reportConfigType in CSI-ReportConfig being set to 'aperiodic'). The aperiodic CSI is reported on PUSCH. The details of the CSI reporting can be according to Section 5.2.1.5.1 of [REF8].

In one example II.2.2, the time domain behavior of the CSI is configured to be 'semiPersistentOnPUCCH' (e.g., by the higher layer parameter reportConfigType in CSI-ReportConfig being set to 'semiPersistentOnPUCCH'). The SP CSI is reported on PUCCH. The details of the CSI reporting can be according to Section 5.2.1.5.2 of [REF8].

In one example II.2.3, the time domain behavior of the CSI is configured to be 'semiPersistentOnPUSCH' (e.g., by the higher layer parameter reportConfigType in CSI-ReportConfig being set to 'semiPersistentOnPUSCH'). The SP CSI is reported on PUSCH. The details of the CSI reporting can be according to Section 5.2.1.5.2 of [REF8].

In one example, only one of example II.2.1 through II.2.3 is fixed or supported in specification (e.g., example II.2.1) when the CSI burst is used for CSI reporting that includes the Doppler component(s) of the channel. In one example, one of examples is configured via higher layer.

Figure 18:
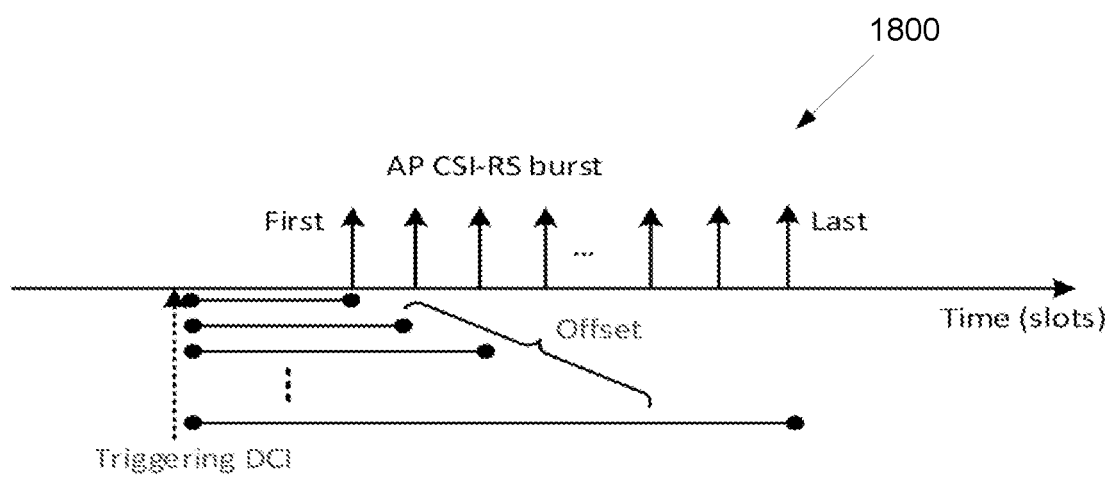
FIG. 18 illustrates a UE configured with CSI resource setting(s) comprising AP CSI-RS resource(s) for channel measurement configured to receive a CSI-RS burst based on a DCI based triggering/activation of a SP CSI-RS resource according to embodiments of the present disclosure.

FIG. 18 illustrates a UE configured with CSI resource setting(s) comprising AP CSI-RS resource(s) for channel measurement configured to receive a CSI-RS burst based on a DCI based triggering/activation of a SP CSI-RS resource 1800 according to embodiments of the present disclosure. The embodiment of the UE configured with CSI resource setting(s) comprising AP CSI-RS resource(s) for channel measurement configured to receive a CSI-RS burst based on a DCI based triggering/activation of a SP CSI-RS resource 1800 illustrated in FIG. 18 is for illustration only. FIG. 18 does not limit the scope of this disclosure to any particular implementation of the UE configured with CSI resource setting(s) comprising AP CSI-RS resource(s) for channel measurement configured to receive a CSI-RS burst based on a DCI based triggering/activation of a SP CSI-RS resource 1800.

In one embodiment II.3, as shown in FIG. 18, a UE is configured (via higher layer) with CSI resource setting(s) comprising (one or multiple sets of) aperiodic (AP) CSI-RS resource(s) for channel measurement (CMR resources). The CSI resource setting(s) may also include (one or multiple sets of) CSI-IM/CSI-RS resource(s) for interference measurement (IMR resources). The UE is configured to receive a CSI-RS burst based on a DCI triggering a group of B>1 AP CSI-RS resources (either in a CSI-RS resource set or across multiple CSI-RS resource sets). The group of AP CSI-RS resources are linked to (or associated with) a single CSI reporting setting (e.g., via higher layer parameter CSI-ReportConfig). Once triggered, the group of AP CSI-RS resources can be used as a uniformly separated or non-uniformly separated CSI-RS burst.

The slot offset for a AP CSI-RS resource is defined as an offset (or difference) between the slot in which the CSI-RS resource is transmitted and the slot containing the DCI that triggers the AP CSI-RS resource. The slot offset for the group of B AP CSI-RS resources can be fixed, or configured via higher layer parameter (e.g., aperiodicTriggeringOffset-Group) or/and MACE CE or/and DCI. At least one of the following examples can be used/configured.

In one example II.3.1, for a uniformly spaced CSI-RS burst, at least one of the following examples can be used/configured.

- In one example II.3.1.1, the slot offset for the group of B AP CSI-RS resources is fixed.
- In one example II.3.1.2, a single offset value v is configured (e.g., via RRC or MAC CE or DCI). The value v is an offset for one of the B AP CSI-RS resources. For example, the one of B AP CSI-RS resources can be fixed, e.g., the first AP CSI-RS resource among the B AP CSI-RS resources, or can be configured. The slot offset for the remaining B−1 AP CSI-RS resources can be determined based on the value d, the spacing between two consecutive CSI-RS resources in the CSI-RS burst, where the value d is fixed.
- In one example II.3.1.3, a valued is configured (e.g., via RRC or MAC CE or DCI), and the offset value v is fixed. The value v can be an offset for one of the B AP CSI-RS resources. For example, the one of B AP CSI-RS resources can be fixed, e.g., the first AP CSI-RS resource among the B AP CSI-RS resources, or can be configured. The slot offset for the remaining B−1 AP CSI-RS resources can be determined based on the value d and the value v.
- In one example II.3.1.4, two values, v and d, are configured. The value v is an offset for one of the B AP CSI-RS resources. For example, the one of B AP CSI-RS resources can be fixed, e.g., the first AP CSI-RS resource among the B AP CSI-RS resources, or can be configured. The slot offset for the remaining B−1 AP CSI-RS resources can be determined based on the value d. In one example, (v,d) is jointly configured via RRC, or MAC CE, or DCI. In one example, v and d are separately configured via RRC, or MAC CE, or DCI.

In one example II.3.2, for a non-uniformly spaced CSI-RS burst, at least one of the following examples can be used/configured.

- In one example II.3.2.1, the slot offset ($d_0$, $d_1$, $d_2$, . . . values) for the group of B AP CSI-RS resources is fixed.
- In one example II.3.2.2, a single offset value v is configured (e.g., via RRC or MAC CE or DCI). The value v is an offset for one of the B AP CSI-RS resources. For example, the one of B AP CSI-RS resources can be fixed, e.g., the first AP CSI-RS resource among the B AP CSI-RS resources, or can be configured. The slot offset for the remaining B−1 AP CSI-RS resources can be fixed.
- In one example II.3.2.3, the slot offsets for a subset of the B AP CSI-RS resources are configured (e.g., via RRC or MAC CE or DCI), where the subset comprise $B_1$<B AP CSI-RS resources. The value $B_1$ or/and the corresponding indices the $B_1$ AP CSI-RS resources can be fixed, or can be configured. The slot offset for the remaining B−$B_1$ AP CSI-RS resources are fixed. In one example, the slot offsets for the $B_1$ AP CSI-RS resources are jointly configured via RRC, or MAC CE, or DCI. In one example, the slot offsets for the $B_1$ AP CSI-RS resources separately configured via RRC, or MAC CE, or DCI.

In one example II.3.2.4, the slot offset for each of the B AP CSI-RS resources is configured (e.g., via RRC or MAC CE or DCI). In one example, the slot offsets for the B AP CSI-RS resources are jointly configured via RRC, or MAC CE, or DCI. In one example, the slot offsets for the B AP CSI-RS resources separately configured via RRC, or MAC CE, or DCI.

In above examples, when the configuration is via RRC, the configuration can be joint with an existing RRC parameter, or separate via a new RRC parameter. When the configuration is via MAC CE, the configuration can be joint with an existing MAC CE parameter, or separate via a new MAC CE parameter. When the configuration is via DCI, the DCI can be the triggering DCI (that triggers the B AP CSI-RS resources), and can be joint with an existing parameter/codepoint or via new codepoint/parameter.

The group of B AP CSI-RS resources, which is triggered via the DCI (e.g., a trigger state via the CSI request field in the DCI), can be determined/configured according to at least one of the following examples.

In one example, the group of B AP CSI-RS resources is higher layer configured. For example, they belong to a CSI-RS resource set, which is higher layer configured. Or, they can belong to different CSI-RS resource sets, and the corresponding group is higher layer configured.

In one example, the group of B AP CSI-RS resources is selected from a large pool of AP CSI-RS resources (which is higher layer configured). This selection can be via a MAC CE based activation/selection mechanism.

In one example, the group of B AP CSI-RS resources is selected/triggered via DCI from a large pool of AP CSI-RS resources (which is higher layer configured) or from an intermediate pool of AP CSI-RS resources which is selected via MAC CE (from a large pool of AP CSI-RS resources which is higher layer configured).

In one embodiment II.4, which is a variation of embodiment II.3, the group of B AP CSI-RS resources is selected from a large pool of AP CSI-RS resources (which is higher layer configured). This selection can be via a MAC CE based activation/selection mechanism. There is no additional DCI triggering (or a trigger state via the CSI request field in the DCI is not needed). The UE starts receiving the B AP CSI-RS resources starting from a slot that is at least after slot $n+3N_{slot}^{subframe, \mu}$ (depending on the slot offsets of the B AP CSI-RS resources) where μ is the SCS configuration for the PUCCH with HARQ-ACK corresponding to the PDSCH carrying the MAC CE based selection indication, and n is the slot number in which HARQ-ACK is transmitted. In this variation, the slot offsets of the B AP CSI-RS resources are equal to or large than $N_{slot}^{subframe, \mu}$. The rest of the details in embodiment II.3 also apply to this embodiment.

In one embodiment II.5, a UE is configured with a CSI-RS burst based on a group of B AP CSI-RS resources, as described in embodiments II.3 and II.4, where the CSI-RS burst is linked to (or associated with) a CSI reporting setting (e.g., via higher layer parameter CSI-ReportConfig). In one example, the UE receives the CSI-RS burst, estimates the DL channels, and obtains the Doppler component(s) of the channel, as described in embodiment I.1. Then, based on the CSI reporting setting, the UE determines a CSI that includes the Doppler component(s) of the channel, and reports the CSI. The time domain behavior of the CSI is fixed/configured to be 'aperiodic' (e.g., by the higher layer parameter reportConfigType in CSI-ReportConfig being set to 'aperiodic'). The aperiodic CSI is reported on PUSCH. The details of the CSI reporting can be according to Section 5.2.1.5.1 of [REF8].

Figure 19:
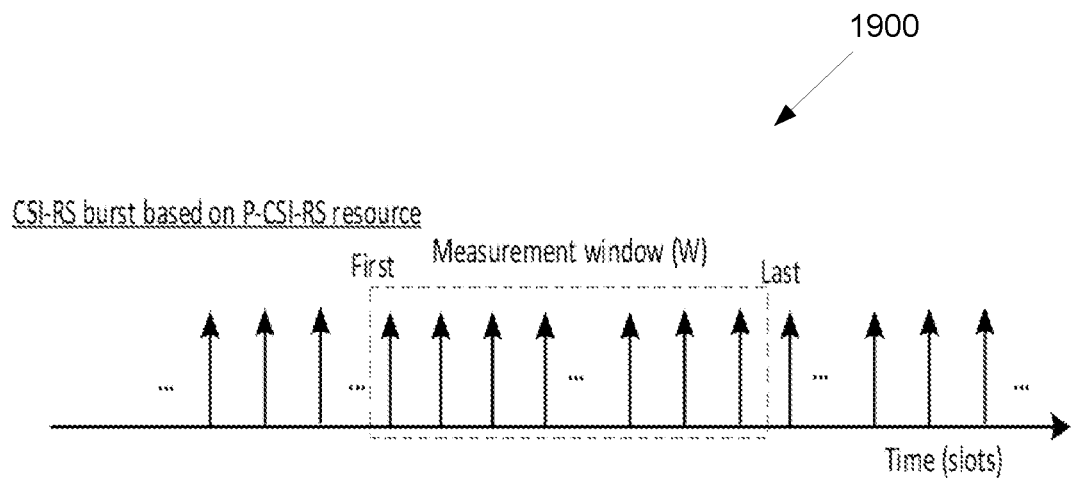
FIG. 19 illustrates a UE configured with CSI resource setting(s) comprising periodic (P) CSI-RS resource(s) for channel measurement according to embodiments of the present disclosure.

FIG. 19 illustrates a UE configured with CSI resource setting(s) comprising periodic (P) CSI-RS resource(s) for channel measurement 1900 according to embodiments of the present disclosure. The embodiment of the UE configured with CSI resource setting(s) comprising periodic (P) CSI-RS resource(s) for channel measurement 1900 illustrated in FIG. 19 is for illustration only. FIG. 19 does not limit the scope of this disclosure to any particular implementation of the UE configured with CSI resource setting(s) comprising periodic (P) CSI-RS resource(s) for channel measurement 1900.

In one embodiment II.5A, a UE is configured (via higher layer) with CSI resource setting(s) comprising (one or multiple sets of) periodic (P) CSI-RS resource(s) for channel measurement (CMR resources). The CSI resource setting(s) may also include (one or multiple sets of) CSI-IM/CSI-RS resource(s) for interference measurement (IMR resources). The UE is configured to receive a CSI-RS burst based on a measurement window (W) of a P-CSI-RS resource. The periodicity and the slot offset of a P-CSI-RS resource is configured via higher layer parameter periodicityAndOffset. The measurement window (W) of the periodic CSI-RS resource can be used as a uniformly separated CSI-RS burst comprising a first and a last time instances, as shown in FIG. 19. The CSI-RS burst (based on a P-CSI-RS resource) can be linked to (or associated with) a single CSI reporting setting (e.g., via higher layer parameter CSI-ReportConfig). In one example, the P-CSI-RS resource is a CSI-RS for tracking (TRS), as described in section 5.1.6.1.1 of TS 38.214. In one example, the P-CSI-RS resource is a CSI-RS for CSI reporting (not a TRS). In one example, the P-CSI-RS resource is a TRS or a CSI-RS for CSI reporting.

In one example, the measurement window W includes time instances $M_{init}+k$, where k=0, 1, . . . , B−1, and $M_{init}$ corresponds to the first (start) time instance. The value of $M_{init}$ can be fixed, or configured (via higher layer IE CSI-ResourceConfig, or CSI-ReportConfig or NZP-CSI-RS-Resource or NZP-CSI-RS-ResourceSet as described in TS 38.331), or reported by the UE (e.g., as part of the CSI report). Alternatively, the value of $M_{init}$ is indicated dynamically, e.g., via MAC CE or DCI based indication. Likewise, the value of B can also be fixed, or configured (via higher layer IE CSI-ResourceConfig, or CSI-ReportConfig or NZP-CSI-RS-Resource or NZP-CSI-RS-ResourceSet as described in TS 38.331), or reported by the UE (e.g., as part of the CSI report). Alternatively, the value of B is indicated dynamically, e.g., via MAC CE or DCI based indication.

In one example, the measurement window W includes time instances $M_{init}+\delta \times k$, where k=0, 1, . . . ,B−1, $M_{init}$ corresponds to the first (start) time instance, and δ is a offset (difference between two consecutive measurement instance within the measurement window. The value of $M_{init}$ can be fixed, or configured (via higher layer IE CSI-ResourceConfig, or CSI-ReportConfig or NZP-CSI-RS-Resource or NZP-CSI-RS-ResourceSet as described in TS 38.331), or reported by the UE (e.g., as part of the CSI report). Alternatively, the value of $M_{init}$ is indicated dynamically, e.g., via MAC CE or DCI based indication. Likewise, the value of B can also be fixed, or configured (via higher layer IE CSI-ResourceConfig, or CSI-ReportConfig or NZP-CSI-RS-Resource or NZP-CSI-RS-ResourceSet as described in TS 38.331), or reported by the UE (e.g., as part of the CSI report). Alternatively, the value of B is indicated dynamically, e.g., via MAC CE or DCI based indication. Likewise, the value of δ can also be fixed, or configured (via higher layer IE CSI-ResourceConfig, or CSI-ReportConfig or NZP-CSI-RS-Resource or NZP-CSI-RS-ResourceSet as described in TS 38.331), or reported by the UE (e.g., as part of the CSI report). Alternatively, the value of δ is indicated dynamically, e.g., via MAC CE or DCI based indication.

When DCI is used for indication of $M_{init}$ or/and B or/and δ, DCI that triggers an AP CSI report based on a P-CSI-RS resource can be used. In particular, the DCI can include the information (e.g., above mentioned parameters) about the measurement window. Alternatively, the information about the measurement window can be included in the higher layer IE CSI-TriggerState definition. Or, the information can be configured via separate higher layer IE(s).

In one example, the measurement window (W) can also be periodic with a larger periodicity than the periodicity of the P-CSI-RS resource, and an offset w.r.t. the P-CSI-RS resource. The periodicity or/and offset of the measurement window can be fixed, or one of or both of the periodicity and the offset are configured (e.g., periodicityAndOffsetMeasurementWindow) or indicated (e.g., via MAC CE or DCI).

In one embodiment II.5B, which is a variation of embodiment II.5A, a UE is configured multiple P-CSI-RS resources, each is used to configure one or multiple CSI-RS bursts based on measurement windows within each P-CSI-RS resources. The details about each measurement window are the same as in embodiment II.5A. The measurement windows of the multiple CSI-RS resources can be according at least one of the following examples.

In one example, the measurement windows are non-overlapping (in time).

In one example, the measurement windows overlap partially (in time).

In one example, the measurement windows are completely overlapping (in time), i.e., they correspond to identical time instances.

Figure 20:
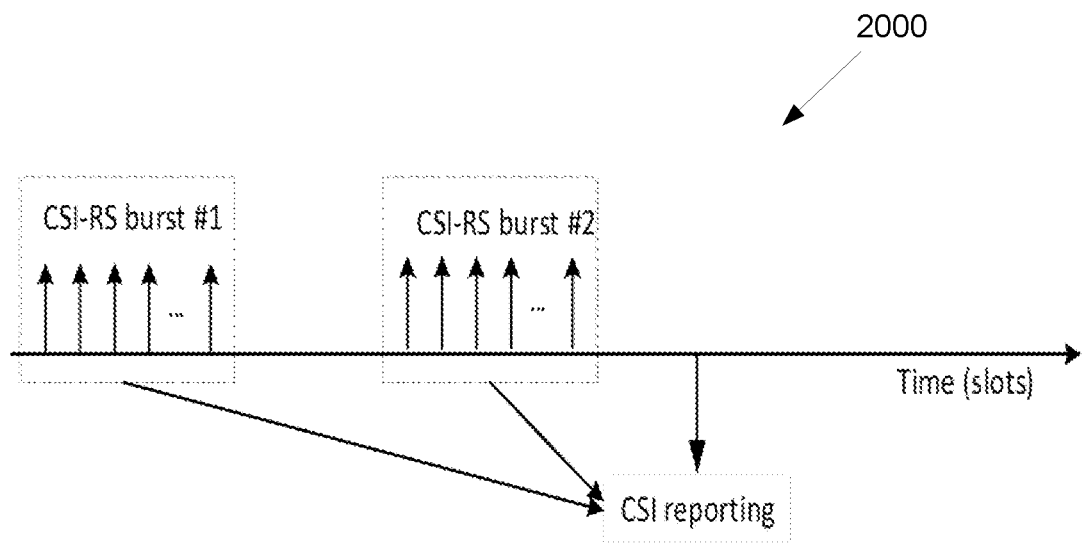
FIG. 20 illustrates a UE configured with $N_{burst}>1$ CSI-RS bursts based on either a SP CSI-RS resource or a group of B AP CSI-RS resources, where multiple CSI-RS bursts are linked to a CSI reporting setting according to embodiments of the present disclosure.

FIG. 20 illustrates a UE configured with $N_{burst}>1$ CSI-RS bursts based on either a SP CSI-RS resource or a group of B AP CSI-RS resources, where multiple CSI-RS bursts are linked to a CSI reporting setting 2000 according to embodiments of the present disclosure. The embodiment of the UE configured with $N_{burst}>1$ CSI-RS bursts based on either a SP CSI-RS resource or a group of B AP CSI-RS resources, where multiple CSI-RS bursts are linked to a CSI reporting setting 2000 illustrated in FIG. 20 is for illustration only. FIG. 20 does not limit the scope of this disclosure to any particular implementation of the UE configured with $N_{burst}>1$ CSI-RS bursts based on either a SP CSI-RS resource or a group of B AP CSI-RS resources, where multiple CSI-RS bursts are linked to a CSI reporting setting 2000.

In one embodiment II.6, as shown in FIG. 20, a UE is configured with $N_{burst}>1$ (i.e., multiple) CSI-RS bursts based on either a SP CSI-RS resource (cf. embodiment II.1, II.2) or a group of B AP CSI-RS resources (embodiments II.3 and II.4), where multiple CSI-RS bursts are linked to (or associated with) a CSI reporting setting (e.g., via higher layer parameter CSI-ReportConfig). The value $N_{burst}$ can be fixed, or configured (e.g., via RRC or MAC CE or DCI), or reported by the UE (e.g., as part of UE capability reporting or as part of a CSI report). In one example, the UE receives the $N_{burst}$ CSI-RS bursts, estimates the DL channels, and obtains the Doppler component(s) of the channel using all of the $N_{burst}$ CSI-RS bursts, as described in embodiment I.1. Then, based on the CSI reporting setting, the UE determines a CSI (based on the $N_{burst}$ CSI-RS bursts) that includes the Doppler component(s) of the channel, and reports the CSI. There can be some restrictions in using multiple CSI-RS bursts. For example, In one example, the multiple CSI-RS bursts is restricted only to the CSI-RS bursts based on a SP CSI-RS resource. That is, $N_{burst}>1$ can only be supported/configured for a SP CSI-RS burst, and $N_{burst}=1$ is the only supported value for a AP CSI-RS burst.

In one example, the multiple CSI-RS bursts is restricted only to a SP CSI reporting, wherein each reporting instance of the SP CSI reporting is based on either a single CSI-RS burst (e.g., the latest CSI-RS burst) or multiple CSI-RS bursts (e.g., the latest $N_{burst}$ CSI-RS bursts). In one example, the CSI-RS burst in this case is restricted to a SP CSI-RS burst.

Figure 21:
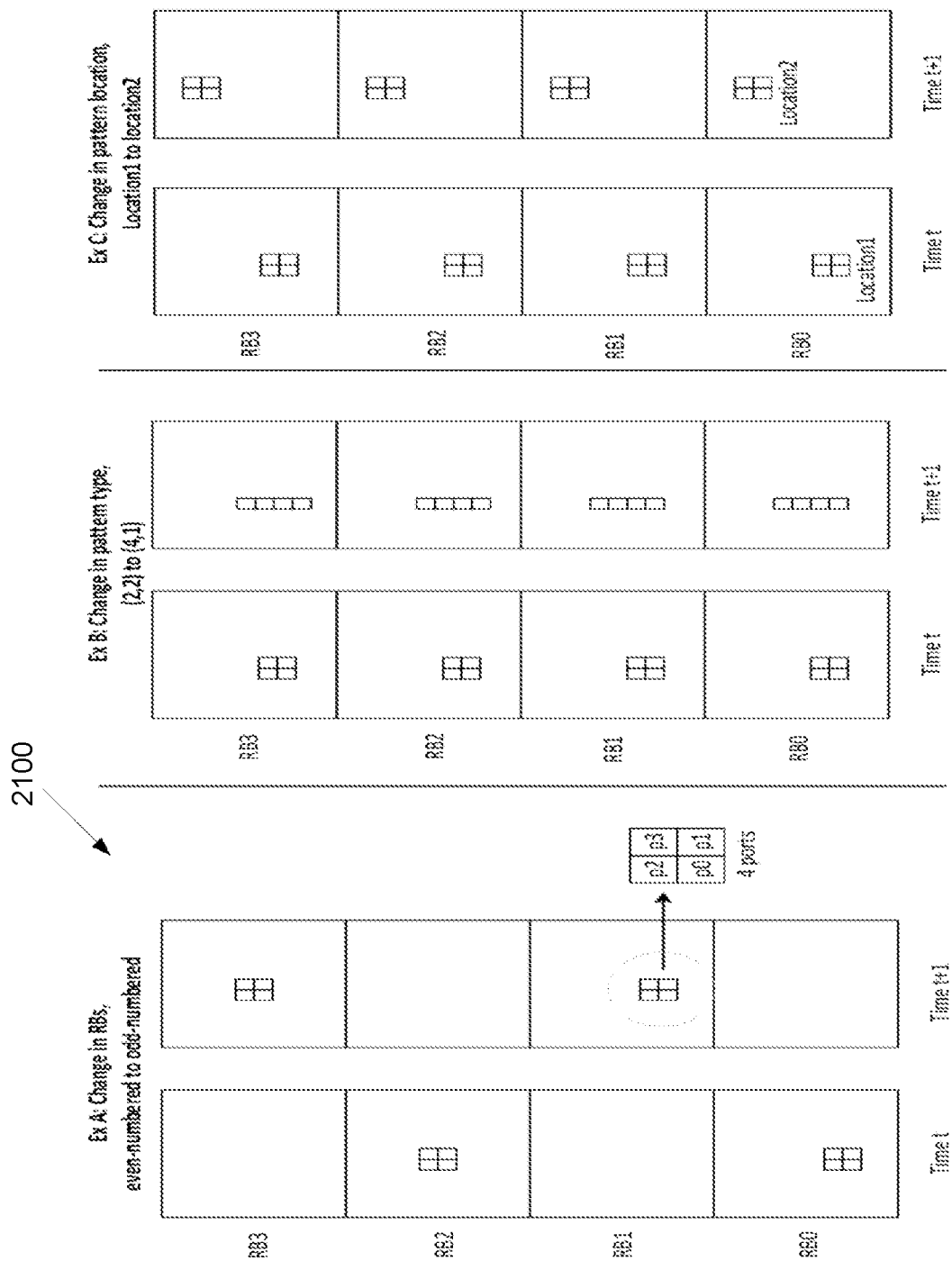
FIG. 21 illustrates a UE configured with one or multiple CSI-RS bursts, where at least one aspect regarding the CSI-RS resources changes across time according to embodiments of the present disclosure.

FIG. 21 illustrates a UE configured with one or multiple CSI-RS bursts, where at least one aspect regarding the CSI-RS resources changes across time 2100 according to embodiments of the present disclosure. The embodiment of the UE configured with one or multiple CSI-RS bursts, where at least one aspect regarding the CSI-RS resources changes across time 2100 illustrated in FIG. 21 is for illustration only. FIG. 21 does not limit the scope of this disclosure to any particular implementation of the UE configured with one or multiple CSI-RS bursts, where at least one aspect regarding the CSI-RS resources changes across time 2100.

In one embodiment II.7, a UE is configured with one or multiple CSI-RS bursts, as described in this disclosure, wherein at least one aspect regarding the CSI-RS resources changes across time (e.g., across time instances within a burst or/and across multiple bursts). Three examples of the change in one aspect are illustrated in FIG. 21.

In EX A, the change is based on the set of RBs the CSI-RS resources belong to. For example, the set of RBs changes from even-numbered RBs to odd-numbered RBs. In one example, this type of change can be based a lower CSI-RS density value, e.g., density=0.5 or 0.25 or 1/N, where N belongs to the set {2, 4, 8, . . . }.

In EX B, the change is based on the CSI-RS RE pattern type. For example, the CSI-RS pattern changes from (2,2) to (4,1). In one example, this type of change can be based on some of the CSI-RS parameters, e.g., $(\bar{k},\bar{l})$, as described in Table 7.4.1.5.3-1 of [REF10]. In one example, the change in the CSI pattern type is such that there is no overlap between the CSI-RS patterns across time. In one example, there can be some overlap in CSI-RS RE patterns.

In EX C, the change is based on the location of the CSI-RS pattern. For example, the location changes from location1 to location2. In one example, this type of change can be based on some of the CSI-RS parameters, e.g., (k',l'), as described in Table 7.4.1.5.3-1 of [REF10]. In one example, the change in the CSI-RS location is such that there is no overlap between the CSI-RS patterns across time. In one example, there can be some overlap in CSI-RS RE patterns.

When one or multiple aspects change across time, at least one of the following examples can be used/configured.

In one example II.7.1, only aspect changes, and one of Ex A, Ex B, and Ex C is used.

In one example II.7.2, two aspects change, and one of combinations (Ex A, Ex B), (Ex A, Ex C), and (Ex C, Ex B) is used.

In one example II.7.3, three aspects change, and a combination of (Ex A, Ex B, Ex C) is used.

In one example, the change in at least one aspect regarding the CSI-RS resources doesn't require any additional signaling (e.g., the change is pre-determined in the specification). In one example, the change in at least one aspect regarding the CSI-RS resources require signaling (e.g., via RRC or/and MAC CE or/and DCI), where the signaling is implicit (based on at least one existing signaling) or explicit (based on additional signaling dedicated for this change).

In one example, the change in at least one aspect regarding the CSI-RS resources across time is restricted to the case when the CSI-RS burst(s) is based on a SP CSI-RS resource.

Figure 22:
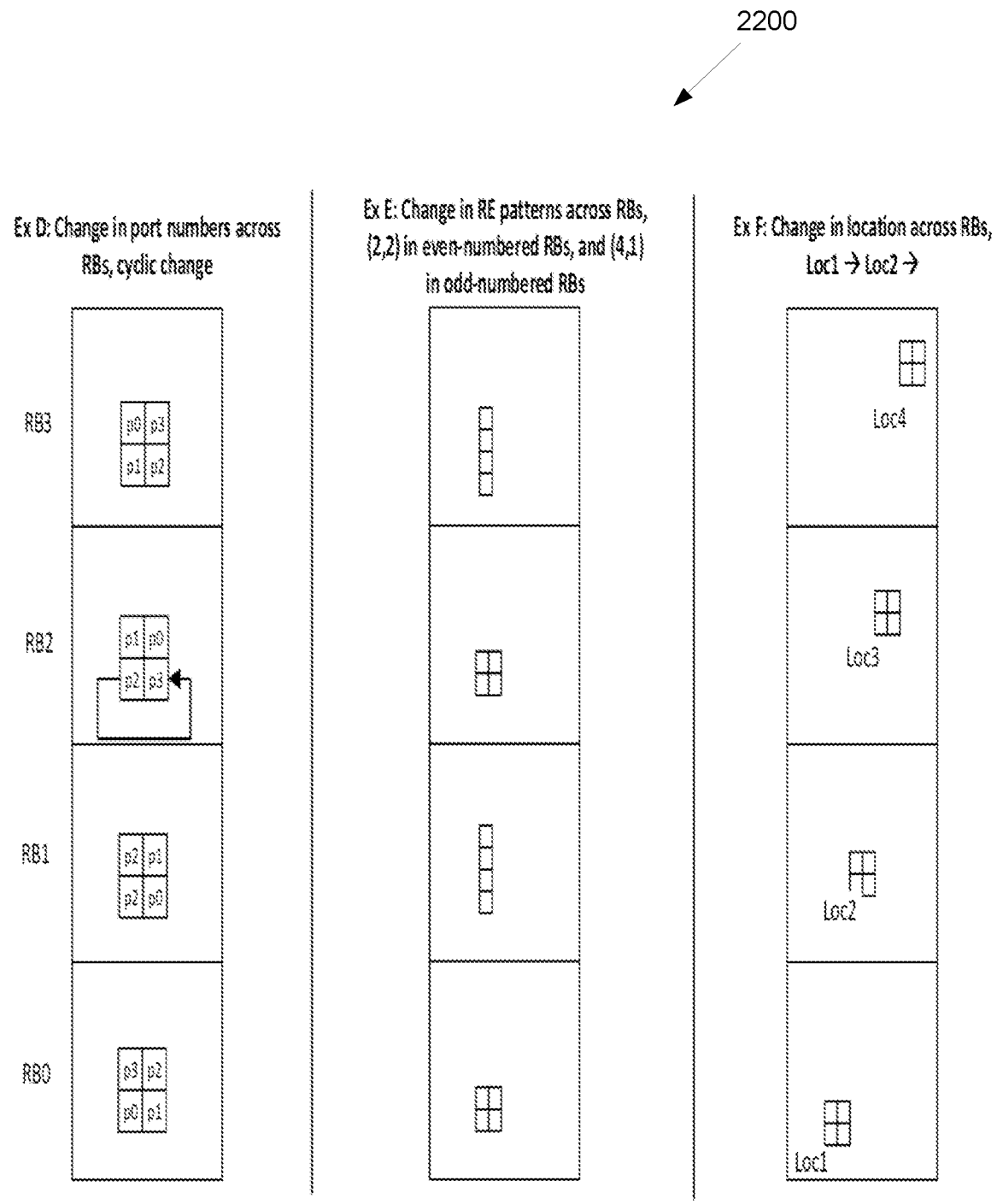
FIG. 22 illustrates a UE configured with one or multiple CSI-RS bursts, where at least one aspect regarding the CSI-RS resources changes across CSI-RS ports according to embodiments of the present disclosure.

FIG. 22 illustrates a UE configured with one or multiple CSI-RS bursts, where at least one aspect regarding the CSI-RS resources changes across CSI-RS ports 2200 according to embodiments of the present disclosure. The embodiment of the UE configured with one or multiple CSI-RS bursts, where at least one aspect regarding the CSI-RS resources changes across CSI-RS ports 2200 illustrated in FIG. 22 is for illustration only. FIG. 22 does not limit the scope of this disclosure to any particular implementation of the UE configured with one or multiple CSI-RS bursts, where at least one aspect regarding the CSI-RS resources changes across CSI-RS ports 2200.

In one embodiment II.8, a UE is configured with one or multiple CSI-RS bursts, as described in this disclosure, wherein at least one aspect regarding the CSI-RS resources changes across CSI-RS ports (e.g., across CSI-RS ports within a burst or/and across multiple bursts). Three examples of the change in one aspect are illustrated in FIG. 22.

In Ex D, the change is based on the changing CSI-RS port numbers across RBs. For example, the CSI-RS port number can change in a cycling manner, i.e., (p0, p1, p2, p3) in RB0 to (p3, p0, p1, p2) in RB1 to (p2, p3, p0, p1) in RB2 and so on.

In Ex E, the change is based on the changing CSI-RS RE pattern type across RBs. For example, the CSI-RS pattern changes from (2,2) in even-numbered RBs to (4,1) in odd-numbered RBs.

In Ex F, the change is based on changing the location of the CSI-RS pattern across RBs. For example, the location changes to Loc1, Loc2, Loc3, Loc4 in RB0, RB1, RB2, RB3, respectively.

When one or multiple aspects change across CSI-RS ports, at least one of the following examples can be used/configured.

In one example II.8.1, only aspect changes, and one of Ex D, Ex E, and Ex F is used.

In one example II.8.2, two aspects change, and one of combinations (Ex D, Ex E), (Ex E, Ex F), and (Ex D, Ex F) is used.

In one example II.8.3, three aspects change, and a combination of (Ex D, Ex E, Ex F) is used.

In one example, the change in at least one aspect regarding the CSI-RS resources across CSI-RS ports is restricted to the case when the CSI-RS burst(s) is based on a SP CSI-RS resource.

In one example, the change in at least one aspect regarding the CSI-RS resources doesn't require any additional signaling (e.g., the change is pre-determined in the specification). In one example, the change in at least one aspect regarding the CSI-RS resources require signaling (e.g., via RRC or/and MAC CE or/and DCI), where the signaling is implicit (based on at least one existing signaling) or explicit (based on additional signaling dedicated for this change).

In one embodiment II.9, a UE is configured with one or multiple CSI-RS bursts, as described in this disclosure, wherein at least one aspect regarding the CSI-RS resources changes across both time and CSI-RS ports (e.g., across time and CSI-RS ports within a burst or/and across multiple bursts). Nine examples of the change both time and CSI-RS ports can be combinations of examples Ex A-C in embodiment II.7 and examples Ex D-F in embodiment II.8, i.e., combinations (Ex A, Ex D), (Ex A, Ex E), (Ex A, Ex F), (Ex B, Ex D), (Ex B, Ex E), (Ex B, Ex F), (Ex C, Ex D), (Ex C, Ex E), (Ex C, Ex F).

When one or multiple aspects change across both time and CSI-RS ports, at least one of the following examples can be used/configured.

In one example II.9.1, a combination of example II.7.1 and example II.8.1.

In one example II.9.2, a combination of example II.7.1 and example II.8.2.

In one example II.9.3, a combination of example II.7.1 and example II.8.3.

In one example II.9.4, a combination of example II.7.2 and example II.8.1.

In one example II.9.5, a combination of example II.7.2 and example II.8.2.

In one example II.9.6, a combination of example II.7.2 and example II.8.3.

In one example II.9.7, a combination of example II.7.3 and example II.8.1.

In one example II.9.8, a combination of example II.7.3 and example II.8.2.

In one example II.9.9, a combination of example II.7.3 and example II.8.3.

In one example, the change in at least one aspect regarding the CSI-RS resources across time and CSI-RS ports is restricted to the case when the CSI-RS burst(s) is based on a SP CSI-RS resource.

In one example, the change in at least one aspect regarding the CSI-RS resources doesn't require any additional signaling (e.g., the change is pre-determined in the specification). In one example, the change in at least one aspect regarding the CSI-RS resources require signaling (e.g., via RRC or/and MAC CE or/and DCI), where the signaling is implicit (based on at least one existing signaling) or explicit (based on additional signaling dedicated for this change).

In one embodiment III.1, a UE is configured (via higher layer) with SRS resource setting(s) comprising (one or multiple sets of) semi-persistent (SP) SRS resource(s). The UE is configured to transmit an SRS burst based on a MAC CE or/and DCI based activation or/and deactivation of a SP SRS resource. The periodicity and the slot offset of an activated SP SRS resource is configured via higher layer parameter periodicityAndOffset-sp. Once activated, a SP SRS resources acts like a periodic SRS resource, hence, it can be used as a uniformly separated SRS burst.

At least one of the following examples is used/configured.

Figure 23:
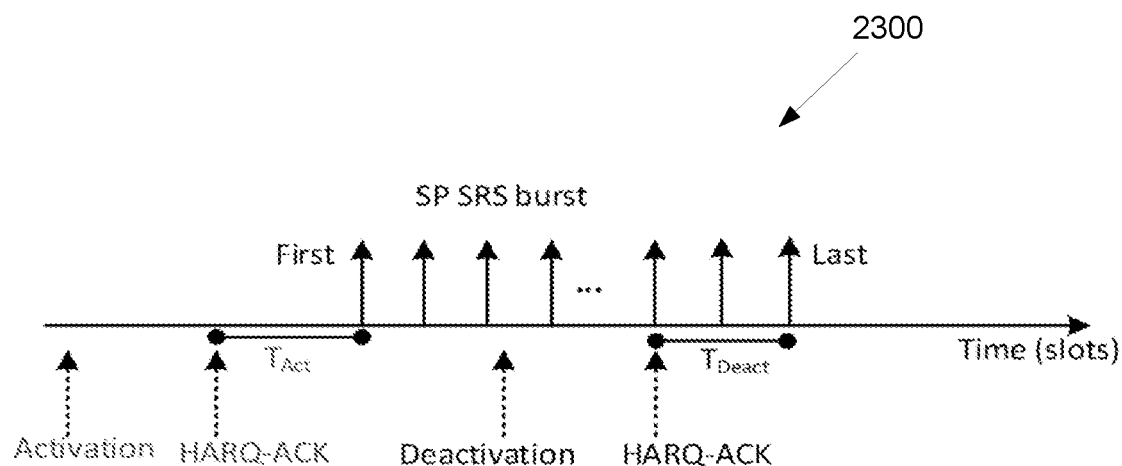
FIG. 23 illustrates a UE configured to transmit an SRS burst based on a MAC CE based activation and deactivation of a SP SRS resource according to embodiments of the present disclosure.

FIG. 23 illustrates a UE configured to transmit an SRS burst based on a MAC CE based activation and deactivation of a SP SRS resource 2300 according to embodiments of the present disclosure. The embodiment of the UE configured to transmit an SRS burst based on a MAC CE based activation and deactivation of a SP SRS resource 2300 illustrated in FIG. 23 is for illustration only. FIG. 23 does not limit the scope of this disclosure to any particular implementation of the UE configured to transmit an SRS burst based on a MAC CE based activation and deactivation of a SP SRS resource 2300.

In one example III.1.1, the UE is configured to transmit an SRS burst based on a MAC CE based activation and deactivation of a SP SRS resource. That is, the UE receives a MAC CE activation command that activates (starts transmission of) a SP SRS resource from the configured SP SRS resource(s), and the UE receives a MAC CE deactivation command that deactivates (ends transmission of) the SP SRS resource. The activation and deactivation commands are received via respective (two) PDSCHs, and the UE transmits a PUCCH with HARQ-ACK corresponding to each PDSCH. The first and the last instances of the SP SRS resource transmissions are after a time duration from the corresponding HARQ-ACK transmissions. This is illustrated in FIG. 23, where $T_{Act}$ is the time duration (#slots) between HARQ-ACK corresponding to the activation command, and $T_{Deact}$ is the time duration (#slots) between HARQ-ACK corresponding to the deactivation command. In one example, $T_{Act}=n_{Act}+3N_{slot}^{subframe, \mu}$, and $T_{Deact}=n_{Deact}+3N_{slot}^{subframe, \mu}$ where $\mu$ is the SCS configuration for the PUCCH, $n_{Act}$ is the slot number in which HARQ-ACK corresponding of activation is transmitted, $n_{Deact}$ is the slot number in which HARQ-ACK corresponding of deactivation is transmitted, and $N_{slot}^{subframe, \mu}$ is the number of slots in a subframe corresponding to the SCS The value of B' (length of an SRS burst) can be determined based on the number of instances (slots), $\tilde{B}$, between the first and the last instances of SP SRS resource transmission. In one example, $\tilde{B}=B$.

Figure 24:
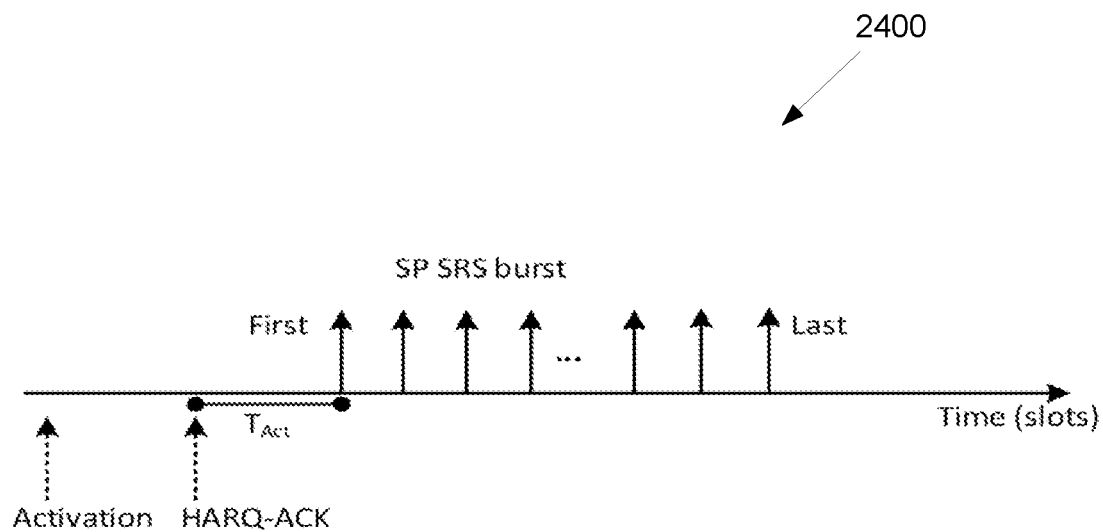
FIG. 24 illustrates a UE configured to transmit an SRS burst based on a MAC CE based activation of a SP SRS resource according to embodiments of the present disclosure.

FIG. 24 illustrates a UE configured to transmit an SRS burst based on a MAC CE based activation of a SP SRS resource 2400 according to embodiments of the present disclosure. The embodiment of the UE configured to transmit an SRS burst based on a MAC CE based activation of a SP SRS resource 2400 illustrated in FIG. 24 is for illustration only. FIG. 24 does not limit the scope of this disclosure to any particular implementation of the UE configured to transmit an SRS burst based on a MAC CE based activation of a SP SRS resource 2400.

In one example III.1.2, which is a variation of example III.1.1, the UE is configured to transmit an SRS burst based on a MAC CE based activation of a SP SRS resource. There is no separate signaling for the deactivation command. That is, the UE receives a MAC CE activation command that activates (starts transmission of) a SP SRS resource from the configured SP CSI-RS resource(s). The ending (last slot) of an activated SP CSI-RS resource transmission can either be fixed, or indicated via the MAC CE that activates the SP SRS resource (either separate or joint CE), or via RRC. The activation command is received via a PDSCH, and the UE transmits a PUCCH with HARQ-ACK corresponding to the PDSCH. The first instance of the SP SRS resource transmission is after a time duration from the HARQ-ACK transmission. This is illustrated in FIG. 24, where $T_{Act}$ is the time duration (#slots) between HARQ-ACK corresponding to the activation command. In one example, $T_{Act}=n_{Act}+3N_{slot}^{subframe, \mu}$. The rest of the details in example III.1.1 also apply to this embodiment.

Figure 25:
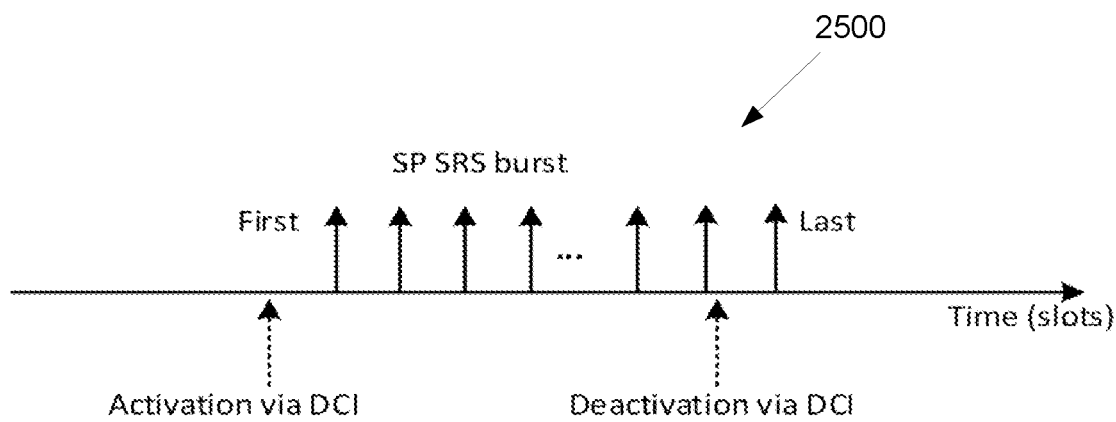
FIG. 25 illustrates a UE configured to transmit an SRS burst based on a DCI based triggering/activation and deactivation of a SP SRS resource according to embodiments of the present disclosure.

FIG. 25 illustrates a UE configured to transmit an SRS burst based on a DCI based triggering/activation and deactivation of a SP SRS resource 2500 according to embodiments of the present disclosure. The embodiment of the UE configured to transmit an SRS burst based on a DCI based triggering/activation and deactivation of a SP SRS resource 2500 illustrated in FIG. 25 is for illustration only. FIG. 25 does not limit the scope of this disclosure to any particular implementation of the UE configured to transmit an SRS burst based on a DCI based triggering/activation and deactivation of a SP SRS resource 2500.

In one example III.1.3, as shown in FIG. 25, the UE is configured to transmit an SRS burst based on a DCI based triggering/activation and deactivation of a SP SRS resource. That is, the UE receives a triggering/activation message via DCI that triggers/activates (starts transmission of) a SP SRS resource from the configured SP SRS resource(s) or from a subset of SP SRS(s) that are selected via MAC CE from the configured SP SRS resource(s). Likewise, the UE receives a deactivation message via another DCI (separate from the triggering DCI) that deactivates (ends transmission of) the SP SRS resource.

For SP SRS resource(s) triggered by a DCI, a set of trigger states can be configured via higher layer, where a SRS request field in DCI activates one of the trigger states. The DCI can be scrambled with a RNTI, e.g., SP-SRS-RNTI. A codepoint of the SRS request field in the DCI is mapped to a triggering state according to the order of the positions of the configured set of trigger states, with codepoint '0' mapped to the triggering state in the first position.

The value of B' (length of an SRS burst) can be determined based on the number of instances (slots), $\tilde{B}$, between the first and the last instances of SP SRS resource transmission. In one example, $\tilde{B}=B$.

Figure 26:
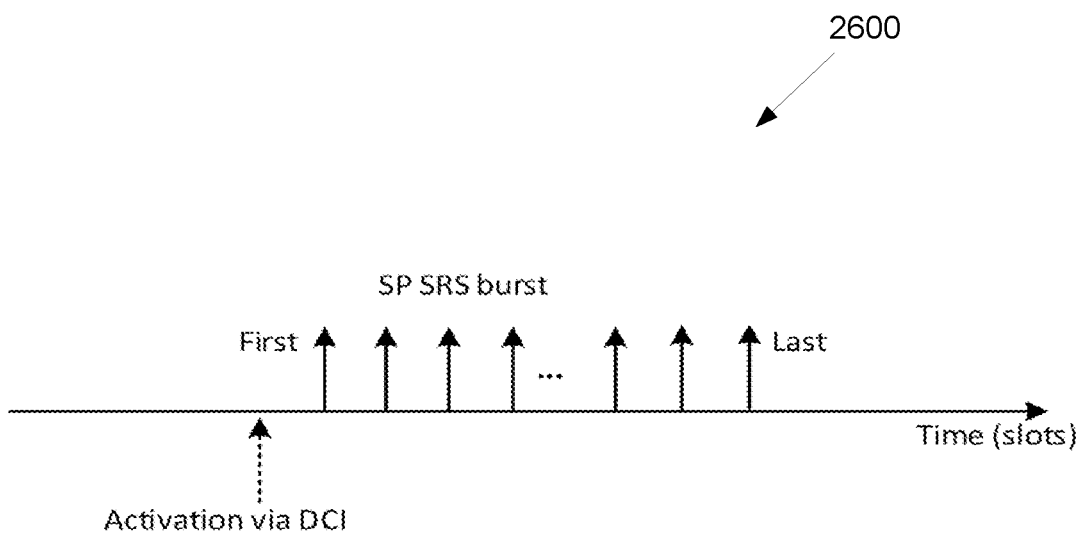
FIG. 26 illustrates a UE configured to transmit an SRS burst based on a DCI based triggering/activation of a SP SRS resource according to embodiments of the present disclosure.

FIG. 26 illustrates a UE configured to transmit an SRS burst based on a DCI based triggering/activation of a SP SRS resource 2600 according to embodiments of the present disclosure. The embodiment of the UE configured to transmit an SRS burst based on a DCI based triggering/activation of a SP SRS resource 2600 illustrated in FIG. 26 is for illustration only. FIG. 26 does not limit the scope of this disclosure to any particular implementation of the UE configured to transmit an SRS burst based on a DCI based triggering/activation of a SP SRS resource 2600.

In one example III.1.4, which is a variation of example III.1.3, as shown in FIG. 26, the UE is configured to transmit an SRS burst based on a DCI based triggering/activation of a SP SRS resource. There is no separate signaling for the deactivation of an activated SP SRS resource. That is, the UE receives a triggering/activation message via DCI that triggers/activates (starts transmission of) a SP SRS resource from the configured SP SRS resource(s) or from a subset of SP SRS(s) that are selected via MAC CE from the configured SP SRS resource(s). The ending (last slot) of an activated SP SRS resource transmission can either be fixed, or indicated via the DCI that triggers/activates the SP SRS resource (either separate or joint codepoint is used), or via MAC CE, or via RRC. The rest of the details in example III.1.3 also apply to this embodiment.

Figure 27:
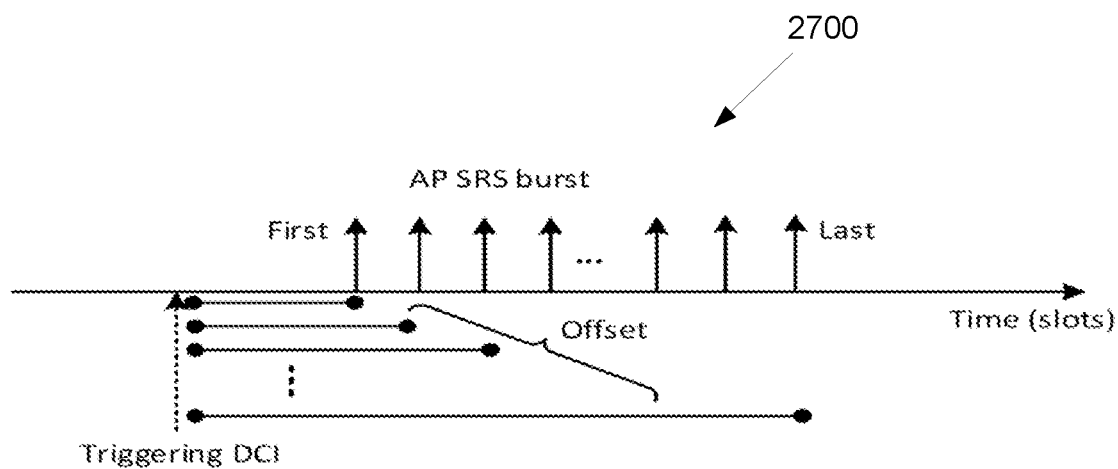
FIG. 27 illustrates a UE configured with SRS resource settings comprising AP SRS resources according to embodiments of the present disclosure.

FIG. 27 illustrates a UE configured with SRS resource settings comprising AP SRS resources 2700 according to embodiments of the present disclosure. The embodiment of the UE configured with SRS resource settings comprising AP SRS resources 2700 illustrated in FIG. 27 is for illustration only. FIG. 27 does not limit the scope of this disclosure to any particular implementation of the UE configured with SRS resource settings comprising AP SRS resources 2700.

In one embodiment III.3, as shown in FIG. 27, a UE is configured (via higher layer) with SRS resource setting(s) comprising (one or multiple sets of) aperiodic (AP) SRS resource(s). The UE is configured to transmit an SRS burst based on a DCI triggering a group of B'>1 AP SRS resources (either in a SRS resource set or across multiple SRS resource sets). Once triggered, the group of AP SRS resources can be used as a uniformly separated or non-uniformly separated SRS burst.

The slot offset for a AP SRS resource is defined as an offset (or difference) between the slot in which the SRS resource is transmitted and the slot containing the DCI that triggers the AP SRS resource. The slot offset for the group of B' AP SRS resources can be fixed, or configured via higher layer parameter (e.g., slotOffsetGroup) or/and MAC CE or/and DCI. At least one of the following examples can be used/configured.

In one example III.3.1, for a uniformly spaced SRS burst, at least one of the following examples can be used/configured.

In one example III.3.1.1, the slot offset for the group of B' AP SRS resources is fixed.

In one example III.3.1.2, a single offset value v is configured (e.g., via RRC or MAC CE or DCI). The value v is an offset for one of the B' AP SRS resources. For example, the one of B AP SRS resources can be fixed, e.g., the first AP SRS resource among the B' AP SRS resources, or can be configured. The slot offset for the remaining B'−1 AP SRS resources can be determined based on the value d, the spacing between two consecutive SRS resources in the SRS burst, where the value d is fixed.

In one example III.3.1.3, a value d is configured (e.g., via RRC or MAC CE or DCI), and the offset value v is fixed. The value v can be an offset for one of the B' AP SRS resources. For example, the one of B' AP SRS resources can be fixed, e.g., the first AP SRS resource among the B' AP SRS resources, or can be configured. The slot offset for the remaining B'−1 AP SRS resources can be determined based on the value d and the value v.

In one example III.3.1.4, two values, v and d, are configured. The value v is an offset for one of the B' AP SRS resources. For example, the one of B' AP SRS resources can be fixed, e.g., the first AP SRS resource among the B' AP SRS resources, or can be configured. The slot offset for the remaining B'−1 AP SRS resources can be determined based on the value d. In one example, (v,d) is jointly configured via RRC, or MAC CE, or DCI. In one example, v and d are separately configured via RRC, or MAC CE, or DCI.

In one example III.3.2, for a non-uniformly spaced SRS burst, at least one of the following examples can be used/configured.

In one example III.3.2.1, the slot offset ($d_0$, $d_1$, $d_2$, . . . values) for the group of B' AP SRS resources is fixed.

In one example III.3.2.2, a single offset value v is configured (e.g., via RRC or MAC CE or DCI). The value v is an offset for one of the B' AP SRS resources. For example, the one of B' AP SRS resources can be fixed, e.g., the first AP SRS resource among the B' AP SRS resources, or can be configured. The slot offset for the remaining B'−1 AP SRS resources can be fixed.

In one example III.3.2.3, the slot offsets for a subset of the B' AP SRS resources are configured (e.g., via RRC or MAC CE or DCI), where the subset comprise $B_1$<B' AP SRS resources. The value $B_1$ or/and the corresponding indices the $B_1$ AP SRS resources can be fixed, or can be configured. The slot offset for the remaining B'−$B_1$ AP SRS resources are fixed. In one example, the slot offsets for the $B_1$ AP SRS resources are jointly configured via RRC, or MAC CE, or DCI. In one example, the slot offsets for the $B_1$ AP SRS resources separately configured via RRC, or MAC CE, or DCI.

In one example III.3.2.4, the slot offset for each of the B' AP SRS resources is configured (e.g., via RRC or MAC CE or DCI). In one example, the slot offsets for the B' AP SRS resources are jointly configured via RRC, or MAC CE, or DCI. In one example, the slot offsets for the B' AP SRS resources separately configured via RRC, or MAC CE, or DCI.

In the above examples, when the configuration is via RRC, the configuration can be joint with an existing RRC parameter, or separate via a new RRC parameter. When the configuration is via MAC CE, the configuration can be joint with an existing MAC CE parameter, or separate via a new MAC CE parameter. When the configuration is via DCI, the DCI can be the triggering DCI (that triggers the B' AP SRS resources), and can be joint with an existing parameter/codepoint or via new codepoint/parameter.

The group of B' AP SRS resources, which is triggered via the DCI (e.g., a trigger state via the SRS request field in the DCI), can be determined/configured according to at least one of the following examples.

In one example, the group of B' AP SRS resources is higher layer configured. For example, they belong to a SRS resource set, which is higher layer configured. Or, they can belong to different SRS resource sets, and the corresponding group is higher layer configured.

In one example, the group of B' AP SRS resources is selected from a large pool of AP SRS resources (which is higher layer configured). This selection can be via a MAC CE based activation/selection mechanism.

In one example, the group of B' AP SRS resources is selected/triggered via DCI from a large pool of AP SRS resources (which is higher layer configured) or from an intermediate pool of AP SRS resources which is selected via MAC CE (from a large pool of AP SRS resources which is higher layer configured).

In one embodiment III.4, which is a variation of embodiment III.3, the group of B' AP SRS resources is selected from a large pool of AP SRS resources (which is higher layer configured). This selection can be via a MAC CE based activation/selection mechanism. There is no additional DCI triggering (or a trigger state via the SRS request field in the DCI is not needed). The UE starts transmitting the B' AP SRS resources starting from a slot that is at least after slot $n+3N_{slot}^{subframe,\mu}$ (depending on the slot offsets of the B AP SRS resources) where μ is the SCS configuration for the PUCCH with HARQ-ACK corresponding to the PDSCH carrying the MAC CE based selection indication, and n is the slot number in which HARQ-ACK is transmitted. In this variation, the slot offsets of the B' AP SRS resources are equal to or large than $3N_{slot}^{subframe,\mu}$. The rest of the details in embodiment III.3 also apply to this embodiment.

Figure 28:
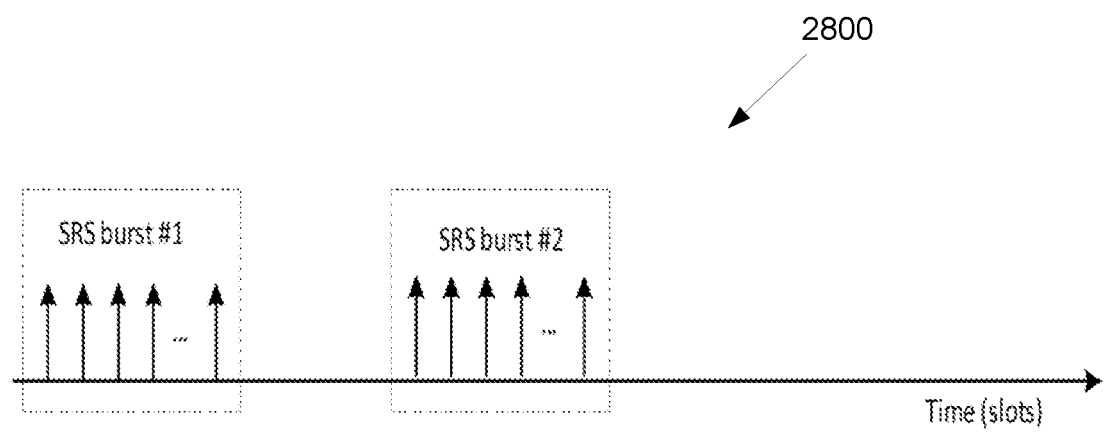
FIG. 28 illustrates a UE configured with $N_{burst}>1$ SRS bursts based on either a SP SRS resource or a group of B' AP SRS resources 2800 according to embodiments of the present disclosure.

FIG. 28 illustrates a UE configured with $N_{burst}$>1 SRS bursts based on either a SP SRS resource or a group of B' AP SRS resources 2800 according to embodiments of the present disclosure. The embodiment of the UE configured with $N_{burst}$>1 SRS bursts based on either a SP SRS resource or a group of B' AP SRS resources 2800 illustrated in FIG. 28 is for illustration only. FIG. 28 does not limit the scope of this disclosure to any particular implementation of the UE configured with $N_{burst}$>1 SRS bursts based on either a SP SRS resource or a group of B' AP SRS resources 2800.

In one embodiment III.6, as shown in FIG. 28, a UE is configured with $N_{burst}$>1 (i.e., multiple) SRS bursts based on either a SP SRS resource (cf. embodiment III.1) or a group of B' AP SRS resources (embodiments III.3 and II.4). The value $N_{burst}$ can be fixed, or configured (e.g., via RRC or MAC CE or DCI), or reported by the UE (e.g., as part of UE capability reporting). In one example, the UE transmits the $N_{burst}$ SRS bursts, according to the configuration, as described in embodiment I.1. There can be some restrictions regarding the multiple SRS bursts. For example, the multiple SRS bursts is restricted only to the SRS bursts based on a SP SRS resource. That is, $N_{burst}>1$ can only be supported/configured for a SP SRS burst, and $N_{burst}=1$ is the only supported value for a AP SRS burst.

Figure 29:
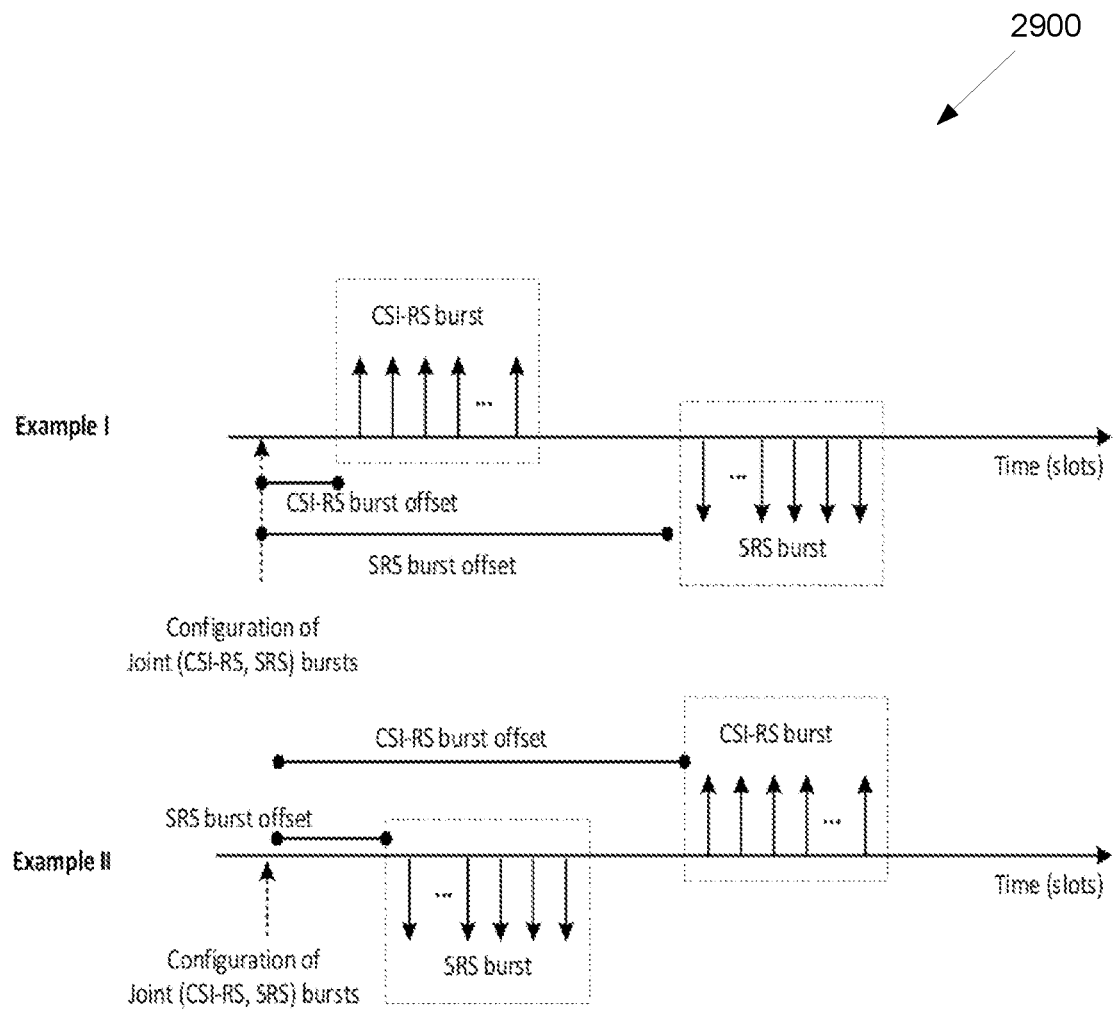
FIG. 29 illustrates a UE configured with a combination of CSI-RS and SRS bursts, wherein the combination comprises $N_{burst}^{CSIRS} \leq 1$ CSI-RS bursts, and $N_{burst}^{SRS} \geq 1$ SRS bursts according to embodiments of the present disclosure.

FIG. 29 illustrates a UE configured with a combination of CSI-RS and SRS bursts, wherein the combination comprises $N_{burst}^{CSIRS} \geq 1$ CSI-RS bursts, and $N_{burst}^{SRS} \geq 1$ SRS bursts 2900 according to embodiments of the present disclosure. The embodiment of the UE configured with a combination of CSI-RS and SRS bursts, wherein the combination comprises $N_{burst}^{CSIRS} \geq_1$ CSI-RS bursts, and $N_{burst}^{SRS} \geq 1$ SRS bursts 2900 illustrated in FIG. 29 is for illustration only. FIG. 29 does not limit the scope of this disclosure to any particular implementation of the UE configured with a combination of CSI-RS and SRS bursts, wherein the combination comprises $N_{burst}^{CSIRS} \geq 1$ CSI-RS bursts, and $N_{burst}^{SRS} \geq 1$ SRS bursts 2900.

In one embodiment IV.1, as shown in FIG. 29, a UE is configured with a combination of CSI-RS and SRS bursts, wherein the combination comprises $N_{burst}^{CSIRS} \geq 1$ CSI-RS burst(s), and $N_{burst}^{SRS} \geq 1$ SRS burst(s). At least one of the following examples is used/configured regarding the number of bursts.

In one example, $N_{burst}^{CSIRS}=1$ and $N_{burst}^{SRS}-1$.
In one example, $N_{burst}^{CSIRS}=1$ and $N_{burst}^{SRS}>1$.
In one example, $N_{burst}^{CSIRS}>1$ and $N_{burst}^{SRS}=1$.
In one example, $N_{burst}^{CSIRS}>1$ and $N_{burst}^{SRS}>1$.
In one example, only $N_{burst}^{CSIRS}=1$ and $N_{burst}^{SRS}=1$ can be supported (by specification) when both CSI-RS and SRS bursts are configured.

The SRS burst offset and CSI-RS burst offset can be fixed, or configured via RRC, or via MAC CE, or via DCI. When both are configured, the configuration can be joint (via separate or a joint parameter) or separate (via two separate parameters). Or, one of the SRS burst offset and CSI-RS burst offset is configured via RRC, or via MAC CE, or via DCI, and the other is either fixed or determined based on the configured offset value.

The configuration of (CSI-RS, SRS) burst pair can be joint, e.g., via RRC or/and MACE CE or/and DCI. When configured via DCI, the single (joint) codepoint in the DCI can be used to trigger the (CSI-RS, SRS) burst pair. The codepoint triggers a state from a list of trigger states that is either configured via higher layer or activated via a MACE CE based activation (the activated list via MAC CE can be from a larger pool of trigger states). A trigger state can correspond to one or multiple (CSI-RS, SRS) resource pair(s). Or, a trigger state can correspond to two separate CSI-RS and SRS resource(s). Optionally, two separate codepoints in the DCI can be used to trigger the (CSI-RS, SRS) burst pair, one codepoint for CSI-RS burst(s) and another for SRS burst(s). Each codepoint triggers a state from a respective list of trigger states. Each list of trigger states can be configured via higher layer or activated via a MACE CE based activation (the activated list via MAC CE can be from a larger pool of respective trigger states).

The details about the CSI-RS burst(s) are according to embodiments II.1 through II.9. The details about the SRS burst(s) are according to embodiments III.1 through II.6.

The (slot) location of CSI-RS burst(s) and SRS burst(s) can be according to at least one of the following examples.

In one example, the reception of the CSI-RS burst(s) starts in a slot that is before (prior to) another slot in which the transmission of the SRS burst(s) starts.

In one example, the reception of the SRS burst(s) starts in a slot that is before (prior to) another slot in which the transmission of the CSIRS burst(s) starts.

The instances (or slot locations) of CSI-RS burst(s) and SRS burst(s) can be according to at least one of the following examples.

In one example, the instances (or slot locations) of CSI-RS burst(s) and SRS burst(s) are non-overlapping.

In one example, the instances (or slot locations) of CSI-RS burst(s) and SRS burst(s) can be overlapping.

Any of the above variation embodiments can be utilized independently or in combination with at least one other variation embodiment.

Figure 30:
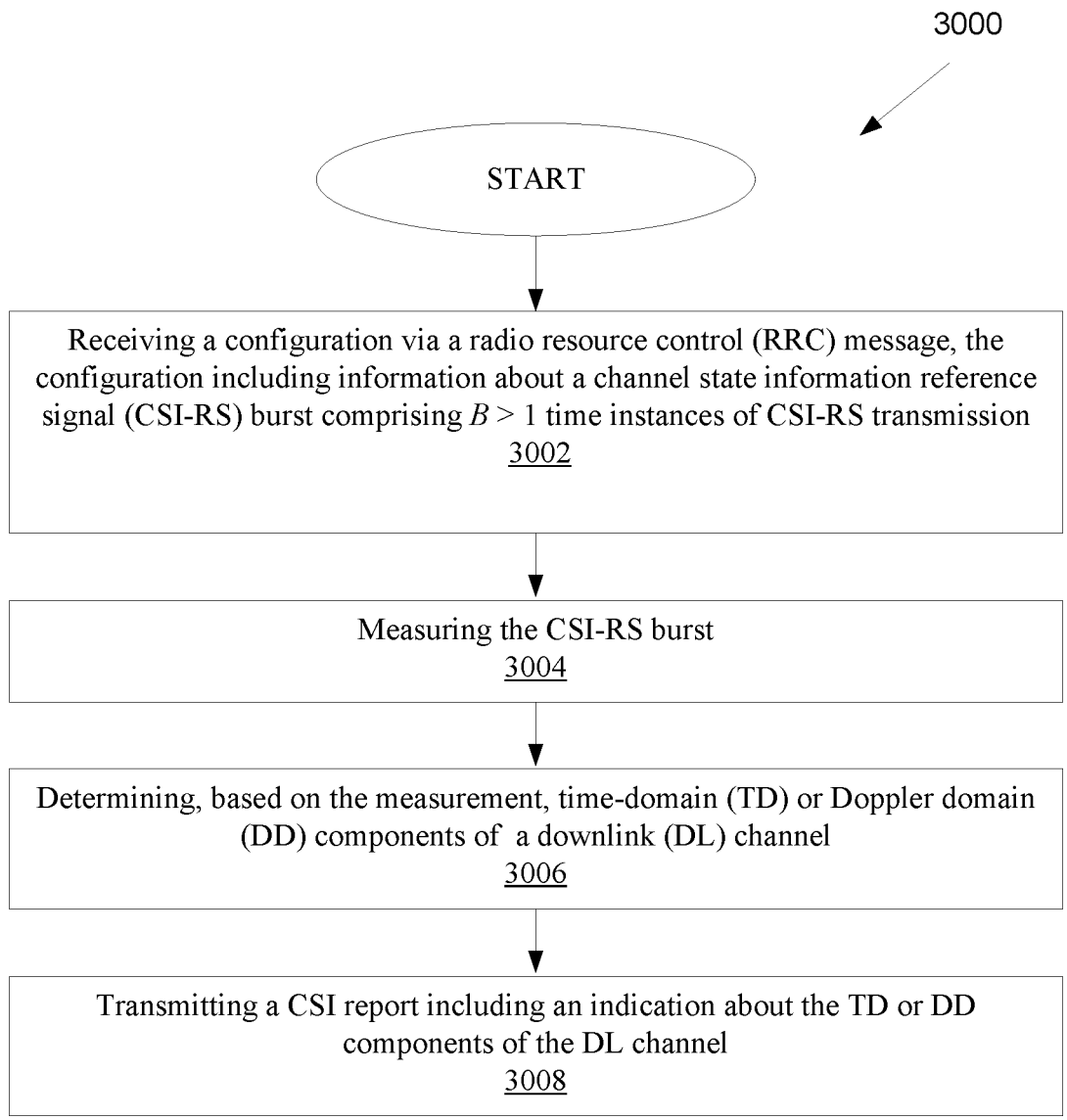
FIG. 30 illustrates a flow chart of a method for operating a UE according to embodiments of the present disclosure.

FIG. 30 illustrates a flow chart of a method 3000 for operating a UE, as may be performed by a UE such as UE 116, according to embodiments of the present disclosure. The embodiment of the method 3000 illustrated in FIG. 30 is for illustration only. FIG. 30 does not limit the scope of this disclosure to any particular implementation.

As illustrated in FIG. 30, the method 3000 begins at step 3002. In step 3002, the UE (e.g., 111-116 as illustrated in FIG. 1) receives a configuration via a radio resource control (RRC) message, the configuration including information about a channel state information reference signal (CSI-RS) burst comprising B>1 time instances of CSI-RS transmission.

In step 3004, the UE measures the CSI-RS burst.

In step 3006, the UE determines, based on the measurement, time-domain (TD) or Doppler domain (DD) components of a downlink (DL) channel.

In step 3008, the UE transmits a CSI report including an indication about the TD or DD components of the DL channel.

In one embodiment, the CSI-RS burst corresponds to a semi-persistent (SP) CSI-RS resource.

In one embodiment, activation of the SP CSI-RS resource is via a medium access control-control element (MAC CE), and deactivation of the SP CSI-RS resource is pre-determined or configured via the RRC message, where activation and deactivation respectively indicate first and last time instances within the B>1 time instances.

In one embodiment, the CSI-RS burst corresponds to a group of aperiodic (AP) CSI-RS resources.

In one embodiment, the group of AP CSI-RS resources is triggered via a downlink control information (DCI).

In one embodiment, the TD or DD components include multiple basis vectors.

In one embodiment, the CSI report further includes: an indication about spatial domain (SD) or frequency domain (FD) components of the DL channel, where the SD or FD components include multiple SD basis vectors or multiple FD basis vectors, respectively; and an indication about coefficients associated with triples of (SD basis vector, FD basis vector, TD or DD basis vector), where a coefficient comprises an amplitude and a phase.

Figure 31:
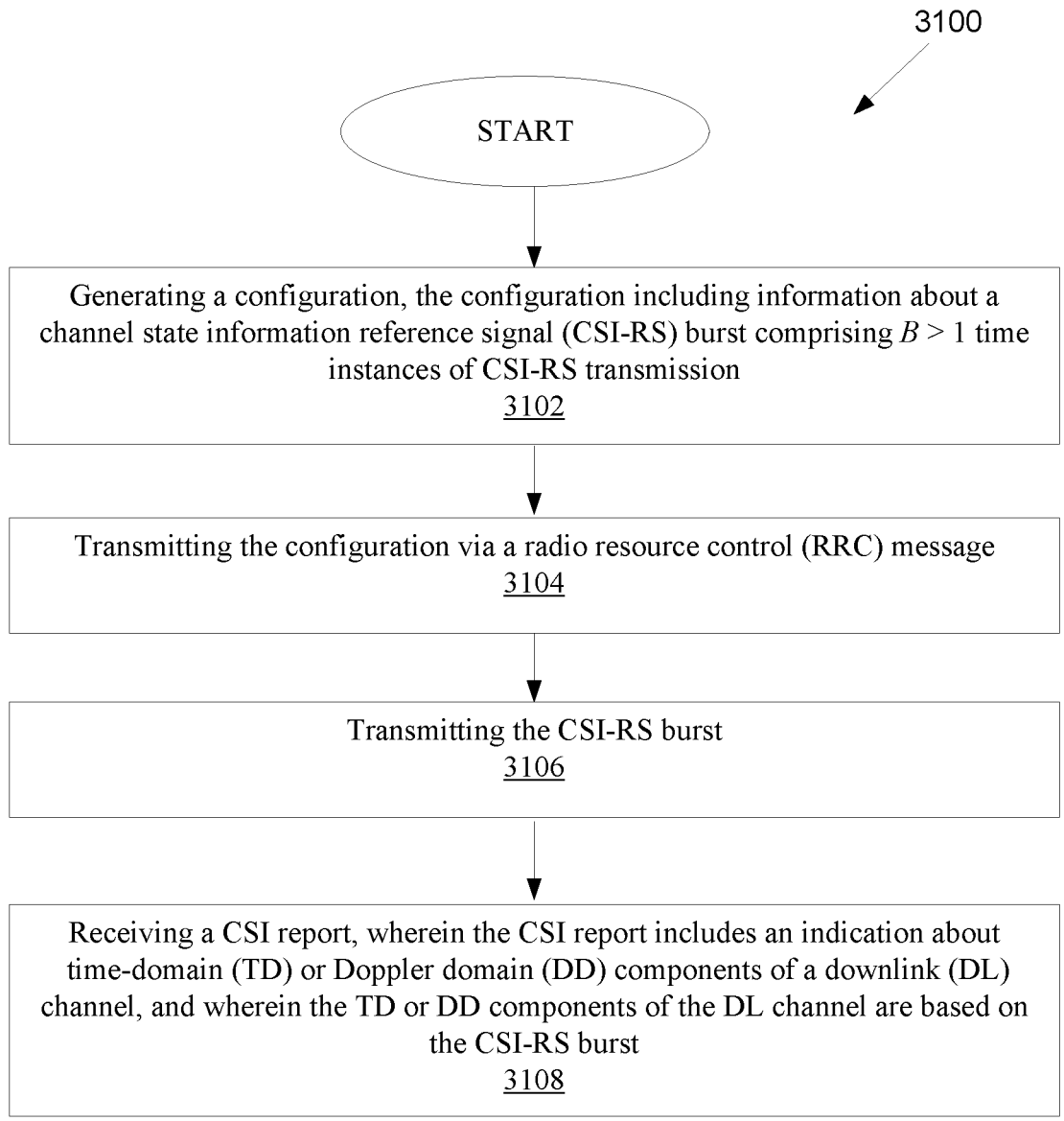
FIG. 31 illustrates a flow chart of a method for operating a BS according to embodiments of the present disclosure.

FIG. 31 illustrates a flow chart of another method 3100, as may be performed by a base station (BS) such as BS 102, according to embodiments of the present disclosure. The embodiment of the method 3100 illustrated in FIG. 31 is for illustration only. FIG. 31 does not limit the scope of this disclosure to any particular implementation.

As illustrated in FIG. 31, the method 3100 begins at step 3102. In step 3102, the BS (e.g., 101-103 as illustrated in FIG. 1), generates a configuration, the configuration including information about a channel state information reference signal (CSI-RS) burst comprising B>1 time instances of CSI-RS transmission.

In step 3104, the BS transmits the configuration via a radio resource control (RRC) message.

In step 3106, the BS transmits the CSI-RS burst.

In step 3108, the BS receives a CSI report, wherein the CSI report includes an indication about time-domain (TD) or Doppler domain (DD) components of a downlink (DL) channel, and wherein the TD or DD components of the DL channel are based on the CSI-RS burst.

In one embodiment, the CSI-RS burst corresponds to a semi-persistent (SP) CSI-RS resource.

In one embodiment, activation of the SP CSI-RS resource is via a medium access control-control element (MAC CE), and deactivation of the SP CSI-RS resource is pre-determined or configured via the RRC message, where activation and deactivation respectively indicate first and last time instances within the B>1 time instances.

In one embodiment, the CSI-RS burst corresponds to a group of aperiodic (AP) CSI-RS resources.

In one embodiment, the group of AP CSI-RS resources is triggered via a downlink control information (DCI).

In one embodiment, the TD or DD components include multiple basis vectors.

In one embodiment, the CSI report further includes: an indication about spatial domain (SD) or frequency domain (FD) components of the DL channel, where the SD or FD components include multiple SD basis vectors or multiple FD basis vectors, respectively; and an indication about coefficients associated with triples of (SD basis vector, FD basis vector, TD or DD basis vector), where a coefficient comprises an amplitude and a phase.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), the UE comprising:
a transceiver configured to receive, via a radio resource control (RRC) message, a configuration including information on a channel state information reference signal (CSI-RS) resource set for a channel measurement; and
a processor operably coupled to the transceiver and configured to:
determine, when the CSI-RS resource set is an aperiodic (AP) CSI-RS resource set, that a number of AP CSI-RS resources in the CSI-RS resource set for the channel measurement is greater than 1;
determine, when the CSI-RS resource set is a semi-persistent (SP) CSI-RS resource set, that a number of SP CSI-RS resources in the CSI-RS resource set for the channel measurement is 1;
perform a downlink (DL) channel measurement based on the CSI-RS resource set; and
determine, based on the DL channel measurement, time domain (TD) basis vectors or Doppler domain (DD) basis vectors;
wherein the transceiver is further configured to transmit a CSI report including an indication associated with the TD basis vectors or the DD basis vectors.

2. The UE of claim 1, wherein the transceiver is further configured to receive a configuration for indicating the CSI report associated with the DD basis vectors.

3. The UE of claim 1, wherein the configuration further includes information on a CSI-interference measurement (CSI-IM) resource set for an interference measurement.

4. The UE of claim 1, wherein when the CSI-RS resource set is the AP CSI-RS resource set, a plurality of AP CSI-RS resources in the AP CSI-RS resource set is triggered via a downlink control information (DCI) at a time instance.

5. The UE of claim 4, wherein:
separation between two consecutive AP CSI-RS resources among the plurality of AP CSI-RS resources is at least one slot, and
a number of the at least one slot is configured via RRC signaling.

6. The UE of claim 1, wherein:
the TD or DD basis vectors include multiple basis vectors, and
the CSI report further includes:
an indication associated with spatial domain (SD) components or frequency domain (FD) components, where the SD components or the FD components include multiple SD basis vectors or multiple FD basis vectors, respectively; and
an indication for coefficients associated with triples of a SD basis vector, a FD basis vector, and a TD or DD basis vector, where a coefficient comprises an amplitude and a phase.

7. A base station (BS) comprising:
a processor configured to generate a configuration including information on a channel state information reference signal (CSI-RS) resource set for channel measurement; and
a transceiver operably coupled to the transceiver, the transceiver configured to:
transmit the configuration via a radio resource control (RRC) message;
transmit at least one CSI-RS based on the CSI-RS resource set; and
receive a CSI report,
wherein the CSI report includes an indication associated with time domain (TD) or Doppler domain (DD) basis vectors determined based on a downlink (DL) channel measurement,
wherein the TD basis vectors or DD basis components are based on the CSI-RS resource set,
wherein when the CSI-RS resource set is determined to be an aperiodic (AP) CSI-RS resource set, a number of AP CSI-RS resources in the CSI-RS resource set for the channel measurement is greater than 1, and
wherein when the CSI-RS resource set is determined to be of a semi-persistent (SP) CSI-RS resource set, a number of SP CSI-RS resources in the CSI-RS resource set for the channel measurement is 1.

8. The BS of claim 7, wherein the transceiver is further configured to transmit a configuration for indicating the CSI report associated with the DD basis vectors.

9. The BS of claim 7, wherein the configuration further includes information on a CSI-interference measurement (CSI-IM) resource set for an interference measurement.

10. The BS of claim 7, wherein when the CSI-RS resource set is the AP CSI-RS resource set, a plurality of AP CSI-RS resources in the AP CSI-RS resource set is triggered via a downlink control information (DCI) at a time instance.

11. The BS of claim 10, wherein:
separation between two consecutive AP CSI-RS resources among the plurality of AP CSI-RS resources is at least one slot, and
a number of the at least one slot is configured via RRC signaling.

12. The BS of claim 7, wherein:
the TD or DD basis vectors include multiple basis vectors, and
the CSI report further includes:
an indication associated with spatial domain (SD) components or frequency domain (FD) components, where the SD components or the FD components include multiple SD basis vectors or multiple FD basis vectors, respectively; and
an indication for coefficients associated with triples of a SD basis vector, a FD basis vector, and a TD or DD basis vector, where a coefficient comprises an amplitude and a phase.

13. A method performed by a user equipment (UE) in a wireless communication system, the method comprising:
receiving, via a radio resource control (RRC) message, a configuration including information on a channel state information reference signal (CSI-RS) resource set for channel measurement;
determining, when the CSI-RS resource set is an aperiodic (AP) CSI-RS resource set, that a number of AP CSI-RS resources in the CSI-RS resource set for the channel measurement is greater than 1;
determining, when the CSI-RS resource set is a semi-persistent (SP) CSI-RS resource set, that a number of SP CSI-RS resources in the CSI-RS resource set for the channel measurement is 1;
performing a downlink (DL) channel measurement based on the CSI-RS resource set;
determining, based on the DL channel measurement, time domain (TD) or Doppler domain (DD) basis vectors; and
transmitting a CSI report including an indication associated with the TD or DD basis vectors.

14. The method of claim 13, further comprising:
receiving a configuration for indicating the CSI report associated with the DD basis vectors.

15. The method of claim 13, wherein the configuration further includes information on a CSI-interference measurement (CSI-IM) resource set for an interference measurement.

16. The method of claim 13, wherein when the CSI-RS resource set is the AP CSI-RS resource set, a plurality of AP CSI-RS resources in the AP CSI-RS resource set is triggered via a downlink control information (DCI) at a time instance.

17. The method of claim 16, wherein:
separation between two consecutive AP CSI-RS resources among the plurality of AP CSI-RS resources is at least one slot, and
a number of the at least one slot is configured via RRC signaling.

18. The method of claim 13, wherein:
the TD or DD basis vectors include multiple basis vectors, and
the CSI report further includes:
an indication associated with spatial domain (SD) components or frequency domain (FD) components, where the SD components or the FD components include multiple SD basis vectors or multiple FD basis vectors, respectively; and
an indication for coefficients associated with triples of a SD basis vector, a FD basis vector, and a TD or DD basis vector, where a coefficient comprises an amplitude and a phase.

* * * * *